United States Patent [19]
Hayashida et al.

[11] Patent Number: 5,798,189
[45] Date of Patent: Aug. 25, 1998

[54] NICKEL-HYDROGEN SECONDARY BATTERY

[75] Inventors: Hirotaka Hayashida, Fujisawa; Hirohito Teraoka, Funabashi; Tomoyuki Ono, Yokohama; Tsuyoshi Soeda, Chigasaki; Masaaki Yamamoto, Chiba-ken, all of Japan

[73] Assignees: Kabushiki Kaisha Toshiba, Kawasaki; Toshiba Battery Co., Ltd., Tokyo, both of Japan

[21] Appl. No.: 689,488

[22] Filed: Aug. 12, 1996

Related U.S. Application Data

[63] Continuation-in-part of Ser. No. 421,245, Apr. 13, 1995, abandoned.

[30] Foreign Application Priority Data

Apr. 15, 1994 [JP] Japan ................ 6-077162
Jan. 18, 1995 [JP] Japan ................ 7-005747
Oct. 13, 1995 [JP] Japan ................ 7-265858

[51] Int. Cl.$^6$ .................. H01M 4/36; H01M 2/16
[52] U.S. Cl. ............. 429/101; 429/206; 429/223; 429/249
[58] Field of Search .................. 429/101, 218, 429/249, 247, 250, 206, 223, 224, 212, 217; 420/900

[56] References Cited

U.S. PATENT DOCUMENTS

| | | | |
|---|---|---|---|
| 4,283,292 | 8/1981 | Machi et al. | 429/249 X |
| 4,605,603 | 8/1986 | Kanda et al. | 429/59 |
| 5,053,292 | 10/1991 | Hasebe et al. | 429/217 X |
| 5,100,723 | 3/1992 | Iwasaki et al. | 429/249 X |
| 5,290,645 | 3/1994 | Tanaka et al. | 429/249 X |
| 5,318,866 | 6/1994 | Degen et al. | 429/254 |
| 5,589,302 | 12/1996 | Degen et al. | 429/250 |

FOREIGN PATENT DOCUMENTS

| | | |
|---|---|---|
| 5-234577 | 9/1993 | Japan. |
| 6-140015 | 5/1994 | Japan. |
| WO 93/01622 | 1/1993 | WIPO. |

*Primary Examiner*—Anthony Skapars
*Attorney, Agent, or Firm*—Oblon, Spivak, McClelland, Maier & Neustadt, P.C.

[57] ABSTRACT

A nickel-hydrogen secondary battery is disclosed wherein a long life is assured, an improved self-discharging property in a high temperature storage and the inhibition of increase in inner pressure of the battery in the occasion of over-charging can be realized. The nickel-hydrogen secondary battery comprises, a case, a paste-type positive electrode accommodated in the case and containing nickel hydroxide and a polymeric binder, a paste-type negative electrode accommodated in the case and containing a hydrogen-absorbing alloy and a polymeric binder, a separator accommodated in the case in so as to be interposed between the positive and negative electrodes, and an alkali electrolyte accommodated in the case. The separator is formed of a sheet material containing polyolefin-based synthetic resin fibers and has a hydrophilic first surface and a second surface having hydrophilic and hydrophobic portions, the separator is interposed between the positive and negative electrodes with the second surface facing toward the negative electrode.

28 Claims, 8 Drawing Sheets

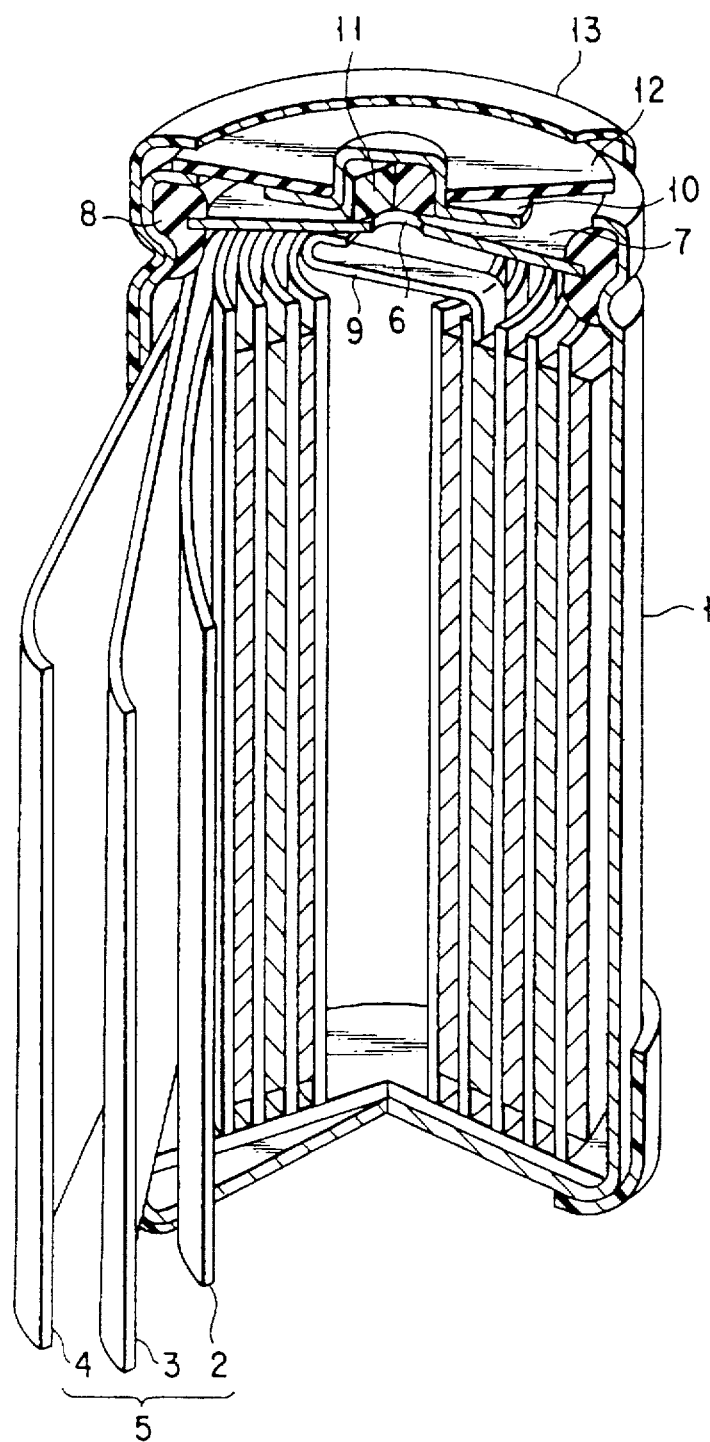
F I G. 1

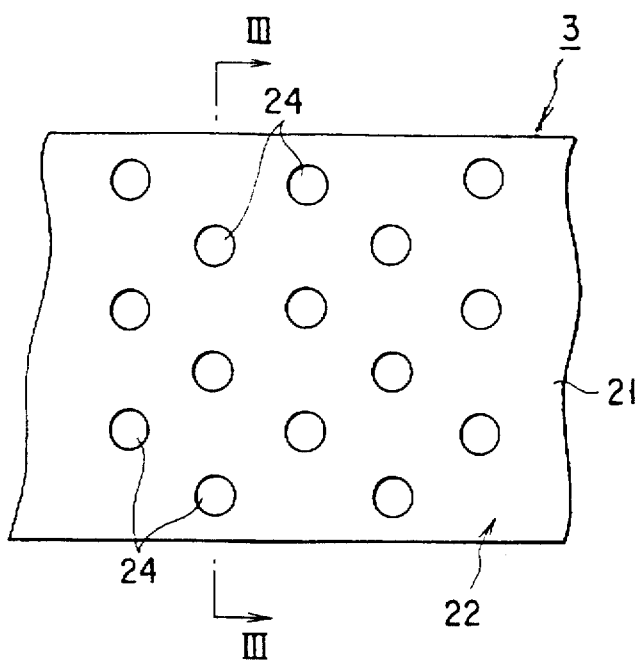
F I G. 2
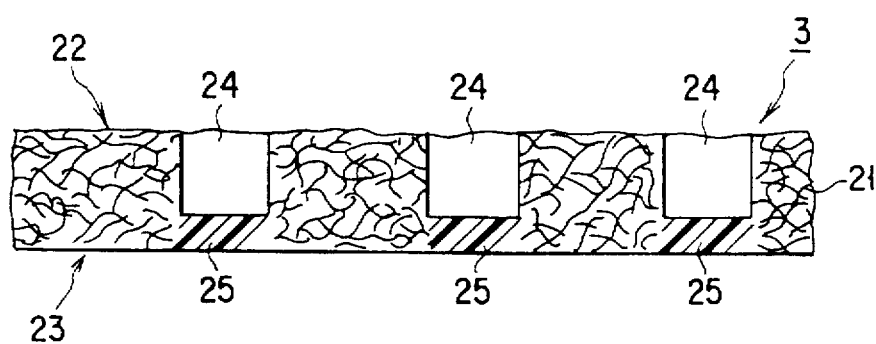
F I G. 3
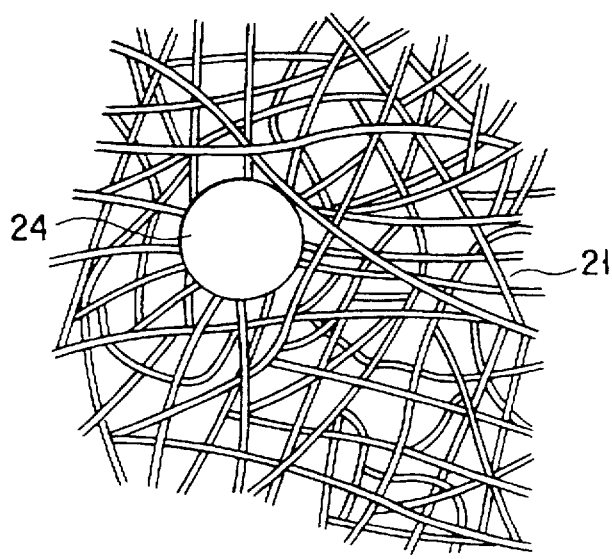
F I G. 4

NICKEL-HYDROGEN SECONDARY BATTERY

CROSS-REFERENCE TO THE RELATED APPLICATION

This application is a continuation-in-part of U.S. patent application Ser. No. 08/421,245, filed Apr. 13, 1995, now abandoned.

BACKGROUND OF THE INVENTION

1. Field of the Invention

This invention relates to a nickel-hydrogen secondary battery and a method for manufacturing the nickel-hydrogen secondary battery, and in particular to a nickel-hydrogen secondary battery and a method for manufacturing the nickel-hydrogen secondary battery wherein the structure of a separator interposed between a paste-type positive electrode and a paste-type negative electrode is improved.

2. Description of the Related Art

There is conventionally known a nickel-hydrogen secondary battery having a structure wherein a group of electrodes comprising a paste-type positive electrode containing nickel hydroxide and a polymeric binder such as, carboxymethyl cellulose or polytetrafluoroethylene, a paste-type negative electrode containing a hydrogen-absorbing alloy and a polymeric binder such as, carboxymethyl cellulose or polytetrafluoroethylene and a separator interposed between these electrodes is accommodated in a case together with alkali electrolyte. This nickel-hydrogen secondary battery is interchangeable, in terms of voltage, with a nickel-cadmium secondary battery comprising a negative electrode containing a cadmium compound in place of the above-mentioned hydrogen-absorbing alloy and is excellent in performance as it has a higher capacity as compared with the nickel-cadmium secondary battery.

However, since the structure of the nickel-hydrogen secondary battery is basically the same as that of the nickel-cadmium secondary battery, the storage of the nickel-hydrogen secondary battery in its charged state under a high temperature condition will raise a problem of self-discharge as in the case of nickel-cadmium secondary battery.

This self-discharge during a high temperature storage of the nickel-cadmium secondary battery is considered to be caused by two factors, i.e. (a) a reducing reaction of nickel oxyhydroxide (NiOOH) which is a product resulting from the charging at the positive electrode due to the generation of impurities (for example, nitrate ion, nitrite ion or ammonia) in an oxidative destruction of the separator; (b) the self-decomposition reaction of NiOOH. Since the self-decomposition reaction of NiOOH (b) is not so active as compared with the above-mentioned reducing reaction of NiOOH, the main cause of self-discharge reaction during a high temperature storage of the nickel-hydrogen secondary battery is considered to be the reducing reaction of NiOOH (a) rather than the reaction of NiOOH (b).

This oxidative destruction of the separator becomes more prominent when a nonwoven fabric comprising a hydrophilic polyamide fiber which is commonly employed in a nickel-cadmium secondary battery is employed as the separator. This is because an impurity such as nitrate ion to be generated by the oxidative decomposition of polyamide synthetic resin fibers causes the reducing of NiOOH of the positive electrode thereby promoting the self-discharge reaction.

Due to this reason, a polyolefin fiber which is excellent in resistance to oxidation but inherently hydrophobic is proposed to be employed as the separator after denaturing the polyolefin fiber through a treatment into hydrophilic fiber.

Meanwhile, in the nickel-hydrogen secondary battery, a hydrogen-absorbing alloy is employed as a negative electrode in contrast to the nickel-cadmium secondary battery, whereby achieving a higher capacity as compared with the nickel-cadmium secondary battery. This hydrogen-absorbing alloy in the negative electrode is capable of absorbing and desorbing hydrogen gas depending on the ambient temperature and pressure. This reversible hydrogen gas-absorbing and desorbing property of the hydrogen-absorbing alloy is utilized in the nickel-hydrogen secondary battery in such a manner that the absorption and desorption of hydrogen gas is performed in a battery case through an electrochemical means instead of utilizing temperature and pressure thereby realizing the production of a secondary battery having a higher capacity than that of the nickel-cadmium secondary battery. The equilibrium pressure at a given temperature and the hydrogen absorption capacity in the hydrogen-absorbing alloy is determined by the composition of the hydrogen-absorbing alloy. Although the equilibrium pressure and the hydrogen absorption capacity in the hydrogen-absorbing alloy are variable more or less depending on the composition of the hydrogen-absorbing alloy as mentioned above, there is a general trend that when the temperature is increased, the equilibrium pressure becomes proportionally higher and the hydrogen absorption capacity is decreased. Accordingly, when the hydrogen absorption capacity of the alloy is decreased, the partial pressure of hydrogen gas in the battery is increased.

In the nickel-hydrogen secondary battery provided with a negative electrode containing a hydrogen-absorbing alloy of such a nature as mentioned above, when it is stored in a high temperature, the equilibrium pressure thereof is increased so that the hydrogen absorption capacity of the alloy is decreased thereby causing the increase of the partial pressure of hydrogen gas in the battery. This phenomenon would be impossible in the case of the nickel-cadmium secondary battery. Since the partial pressure of hydrogen gas in the battery is increased, a reaction of reducing nickel oxyhydroxide (NiOOH) constituting a positive electrode is caused. Therefore, in order to solve the problem of self-discharge during a high temperature storage in the nickel-hydrogen secondary battery, it is necessary to avoid the above-mentioned two factors, i.e. (a) a reaction of reducing nickel oxyhydroxide (NiOOH) which is a product resulting from the charging at the positive electrode due to the generation of impurities in an oxidative destruction of the separator, and (b) the self-decomposition reaction of NiOOH, as well as to avoid an additional factor (c) a phenomenon that is impossible in the case of the nickel-cadmium secondary battery, i.e. the reaction of reducing nickel oxyhydroxide (NiOOH) by hydrogen gas which would be inevitably generated from the hydrogen-absorbing alloy during the storage of it in a high temperature.

For solving these problems, some idea has to be taken in order to prevent the hydrogen gas to be inevitably generated from a negative electrode containing hydrogen absorbing alloy during the storage thereof at a high temperature from reaching the paste-type positive electrode.

Additionally, since the nickel-hydrogen secondary battery is a secondary battery just like the nickel-cadmium secondary battery, oxygen gas is also caused to generate in the occasion of over-charging from the positive electrode according to the following chemical formula.

$$4OH^- \rightarrow O_2 + 2H_2O + 4e^- \qquad (1)$$

The oxygen gas thus generated is passed through a separator and consumed at the surface of the hydrogen-absorbing alloy according to the following chemical formulas (2) and (3).

$$2MH + \tfrac{1}{2}O_2 \rightarrow 2M + H_2O \quad (2)$$

$$2M + 2H_2O + 2e^- \rightarrow 2MH + 2OH^- \quad (3)$$

These oxygen-absorbing reactions (2) and (3) by the negative electrode are caused to occur at the boundary of three phases, i.e. the surface of the negative electrode, an electrolyte on the surface of the negative electrode and the oxygen gas. Accordingly, it is very important for controlling the increase in inner pressure of the battery to create a suitable three-phases boundary on the surface of the negative electrode. However, since the polymeric binder is highly water-absorptive in the case of a paste-type negative electrode containing the polymeric binder together with the hydrogen-absorbing alloy, the creation of such a suitable three-phases boundary is very difficult.

Accordingly, there has been proposed to manufacture the negative electrode by co-using a water-repellent material such as polytetrafluoroethylene as a binder, or by coating the surface of the negative electrode with a water-repellent solution such as a suspension of polytetrafluoroethylene. However, there are several problems in forming a water-repellent surface on the negative electrode by these measures. A first problem is an increase in inner pressure of the battery, since it is difficult to obtain a sufficient degree of water-repellency on the surface of the negative electrode by such measures as mentioned above. A second problem is a disadvantage in obtaining a nickel-hydrogen secondary battery of high capacity. Namely, if it is desired to realize a high capacity in a nickel-hydrogen secondary battery, the amount of an active material has to be increased in a paste-type positive electrode, and at the same time the capacity of a paste-type negative electrode containing a hydrogen-absorbing alloy has to be increased in proportion to the increase in capacity of the positive electrode in order to avoid any bad influence to the gas consumption in the occasion of over-charge and to cycle life. However, since the addition of a water-repellent material such as polytetrafluoroethylene brings about in turn the corresponding reduction of the ratio of hydrogen-absorbing alloy in the negative electrode thereby sacrificing the increasing of capacity of the nickel-hydrogen secondary battery. A third problem is the complication of manufacturing process due to the provision of water-repellency. Accordingly, it is required for the nickel-hydrogen secondary battery to assure an excellent gas permeability of a separator and to create a sufficient degree of the three-phase boundary without deteriorating a high capacity of the battery.

As explained above, in order to inhibit the self-discharge in the nickel-hydrogen secondary battery, some measures have to be taken in order to prevent the hydrogen gas to be inevitably generated from a negative electrode containing hydrogen absorbing alloy during the storage thereof at a high temperature from reaching the paste-type positive electrode. On the other hand, in order to inhibit the increase in inner pressure of the battery in the occasion of over-charging without causing the lowering of capacity, it is required for the nickel-hydrogen secondary battery to assure an excellent gas permeability of a separator and to create a uniform and sufficient degree of the three-phase boundary throughout the surface of the negative electrode. Since there are many conflicting problems between the inhibition of self-discharge during a high temperature storage of the secondary battery and the inhibition of increase in inner pressure in the occasion of over-charging, it has been very difficult to realize both of the inhibitions.

Meanwhile, U.S. Pat. No. 5,290,645 (Tanaka et al.) discloses a battery separator formed of a sheet material comprising a polyvinyl alcohol which is cross-linked via a cross-linking group having a specific structure. This sheet material has a hydrophilic portion and a hydrophobic portion.

Further, International Patent Publication (WO 93/01622) discloses in Example 4 a nickel-hydrogen secondary battery wherein a separator having an ion-exchange capacity of 0.48 (meq/g) and comprising a nonwoven fabric formed of polypropylene monofilament having a thickness (diameter) of 5 to 10 μm and graft-copolymerized with acrylic acid is employed, and at the same time an electrolyte comprising 30% potassium hydroxide is employed.

SUMMARY OF THE INVENTION

Accordingly, the object of the present invention is to provide a nickel-hydrogen secondary battery of long life, which is improved in self-discharging property at a high temperature storage and capable of inhibiting an increase in inner pressure at the occasion of over-charging.

Another object of this invention is to provide a method of manufacturing a nickel-hydrogen secondary battery having excellent properties as mentioned above.

A further object of the present invention is to provide a nickel-hydrogen secondary battery, which is improved in self-discharging property at a high temperature storage.

Namely, according to the present invention, there is provided a nickel-hydrogen secondary battery comprising:
a case,
a paste-type positive electrode accommodated in the case and containing nickel hydroxide oxide and a polymeric binder,
a paste-type negative electrode accommodated in the case and containing a hydrogen-absorbing alloy and a polymeric binder,
a separator accommodated in the case in such a manner as to be interposed between the positive and negative electrodes, and
an alkali electrolyte accommodated in the case;
wherein the separator is formed of a sheet material containing polyolefin-based synthetic resin fibers and has a first surface being made hydrophilic and a second surface located opposite to the first surface, and having a hydrophilic portion and a hydrophobic portion, the separator being interposed between the positive and negative electrodes in such a manner that the second surface faces toward the negative electrode.

According to the present invention, there is further provided a method for manufacturing a nickel-hydrogen secondary battery comprising a case, a paste-type positive electrode accommodated in the case and containing nickel hydroxide and a polymeric binder, a paste-type negative electrode accommodated in the case and containing a hydrogen-absorbing alloy and a polymeric binder, a separator accommodated in the case in such a manner as to be interposed between the positive and negative electrodes, and an alkali electrolyte accommodated in the case; wherein the separator is formed by the steps of:
embossing a first surface of a sheet material containing polyolefin-based synthetic resin fibers thereby forming an embossed film portion; dipping the sheet material into a solution containing a vinyl monomer having a hydrophilic group so as to attaching the solution to the first surface and a second surface located opposite to the first surface except the embossed film portion; and irradiating an energy beam onto the sheet material thereby graft-polymerizing the vinyl monomer attached to the sheet material;

the separator being interposed between the positive and negative electrodes in such a manner that the second surface is faced toward the negative electrode.

According to the present invention, there is further provided a nickel-hydrogen secondary battery comprising:

a positive electrode containing nickel hydroxide;

a negative electrode containing a hydrogen-absorbing alloy;

a separator interposed between the positive electrode and the negative electrode, and an alkali electrolyte;

wherein the separator is formed of a sheet material which comprises fibers including polyolefin-based synthetic resin fibers having an ion-exchange group and satisfies the following equations (1) and (2):

$(0.05X+0.05) \leq Y \leq 2.0$     (1);

$1 \leq X \leq 20$     (2);

wherein Y in the equation (1) represents potassium ion-exchange capacity (meq/g) and X in the equations (1) and (2) represents an average diameter (μm) of the fibers; and the electrolyte comprises at least either lithium hydroxide or sodium hydroxide.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1 is a partially sectioned perspective view showing a nickel-hydrogen secondary battery according to one embodiment of the present invention;

FIG. 2 is a plan view illustrating a manufacturing step of a separator according to the present invention;

FIG. 3 is a sectional view of the separator sectioned along a line III—III in FIG. 2;

FIG. 4 is an enlarged plan view of the separator shown in FIG. 2;

DETAILED DESCRIPTION OF THE PREFERRED EMBODIMENTS

Figure 5:
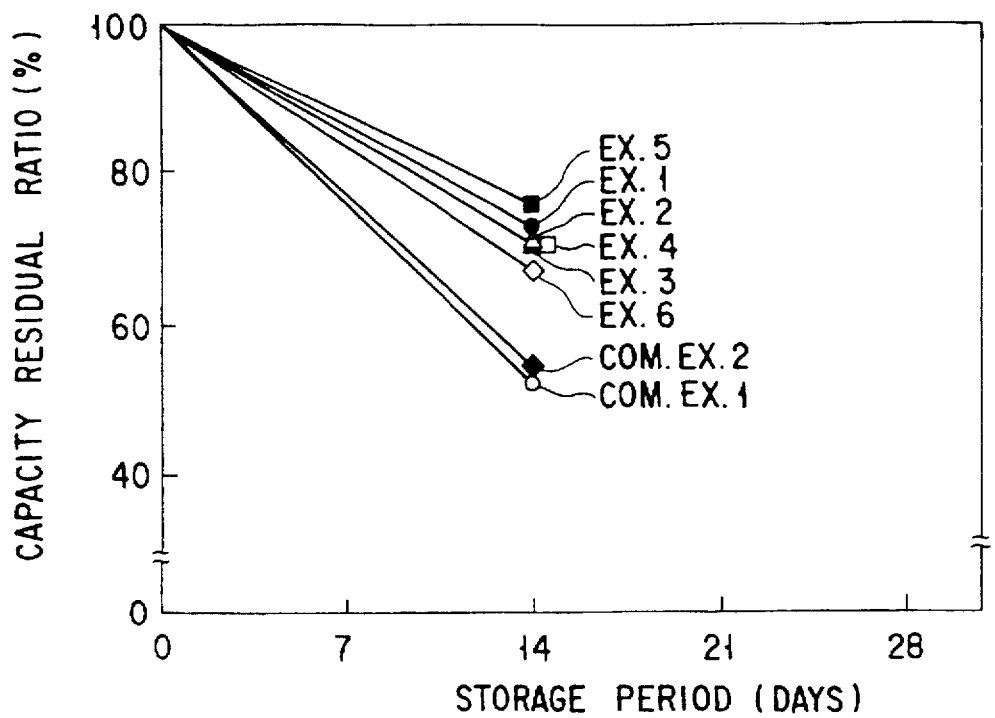
FIG. 5 is a graph showing the relationship between the storage days and the residual capacity ratio of a nickel-hydrogen secondary battery in Examples 1 to 6 of the present invention and Comparative Examples 1 and 2.

This invention will be further explained with reference to a nickel-hydrogen secondary battery shown in FIG. 1 as follows.

Referring to FIG. 1, a closed-end cylindrical case 1 is accommodated therein with an electrode group 5 which has been manufactured by spirally winding a stacked body consisting of a paste-type positive electrode 2, a separator 3 and a paste-type negative electrode 4. The paste-type negative electrode 4 is disposed at the outermost periphery of the electrode group 5 so as to electrically contact with the cylindrical case 1. The cylindrical case 1 is also filled with an alkali electrolyte. A sealing plate 7 formed of a disk having an opening 6 at the center is disposed on the upper opening of the cylindrical case 1. An insulating gasket 8 having a ring-like shape is interposed between the periphery of the sealing plate 7 and the upper inner wall surface of the opening of the cylindrical case 1. The peripheral fringe portion of the opening of the cylindrical case 1 is caulked inward so that the first sealing plate 7 is hermetically fixed via the gasket 8 to cylindrical case 1. A positive lead 9 is connected through its one end to the positive electrode 2 and through its other end to the lower surface of the sealing plate 7. A positive terminal 10 having a hat-like shape is mounted over the sealing plate 7 in such a manner as to cover the opening 6. A rubber safety valve 11 is disposed in a space surrounded by the sealing plate 7 and the positive terminal 10 in such a manner as to seal the opening 6. A holding plate 12 formed of an insulating disk having an opening is disposed over the positive terminal 10 in such a manner that the projected portion of the positive terminal 10 is protruded out through the opening of the holding plate 12. An envelope tube 13 is disposed to cover all of the periphery of the holding plate 12, the side wall of the cylindrical case 1 and the periphery of the bottom of the cylindrical case 1.

Next, the details of the paste-type positive electrode 2, the separator 3, the paste-type negative electrode 4 and the electrolyte will be explained.

(1) The paste-type positive electrode 2

This pate-type positive electrode 2 can be manufactured by adding a conductive material to an active material, i.e. nickel hydroxide powder, and the resultant mixture is kneaded together with a polymeric binder and water to prepare a paste, which is then stuffed into a conductive substrate and, after being dried, molded into a predetermined shape.

As for the conductive material, cobalt oxide or cobalt hydroxide can be used.

Examples of polymeric binder are carboxymethyl cellulose, methyl cellulose, sodium polyacrylate and polytetrafluoroethylene.

Examples of the conductive substrate are net-like, sponge-like, fibrous and felt-like porous body made of nickel, stainless steel or nickel metallizing metal.

(2) The paste-type negative electrode 4

This paste-type negative electrode 4 can be manufactured by adding a conductive material to a hydrogen-absorbing alloy powder, and the resultant mixture is kneaded together with a polymeric binder and water to prepare a paste, which is then stuffed into a conductive substrate and, after being dried, molded into a predetermined shape.

As for the hydrogen-absorbing alloy, there is no specific limitation and any materials can be employed as far as it is capable of absorbing hydrogen gas generated electrochemically in an electrolyte and readily releasing the hydrogen gas thus absorbed at the time of discharge. Examples of the hydrogen-absorbing alloy are $LaNi_5$, $MmNi_5$, (Mm: misch metal), $LmNi_5$, (Lm: lanthanum-rich misch metal), a multi-element system wherein a portion of Ni of the above mentioned compounds is substituted by an element such as Al, Mn, Co, Ti, Cu, Zn, Zr, Cr and B, or TiNi— or TiFe-based alloy. In particular, a hydrogen-absorbing alloy with composition represented formula $LmNi_xMn_yA_z$, wherein Lm represents lanthanum-rich misch metal, A represents at least one element selected from Al and Co, x, y and z are number which meets the equation of $4.8<x+y+z<5.4$, is preferred since the charge/discharge cycle life can be improved by discouraging grain size reduction which occurs as the charge/discharge cycle proceeds.

As for the polymeric binder, the same materials as employed for the positive electrode 2 can be used.

As for the conductive material, for example carbon black can be used.

Examples of the conductive substrate are a two-dimensional substrate such as a punched metal, expanded metal, porous copper plate and a nickel net, and a three-dimensional substrate such as a felt-like metallic porous body and a sponge-like metallic substrate.

(3) The separator 3

The separator 3 is formed of a sheet material containing polyolefin-based synthetic resin fibers and has a first surface being made hydrophilic and a second surface located opposite to the first surface, and having a hydrophilic portion and a hydrophobic portion. The separator 3 is interposed between the positive and negative electrodes 2, 4 in such a manner that the second surface is faced toward the negative electrode 4.

Example of polyolefin-based synthetic resin fibers are polyolefin single fibers, a core-sheath type composite fiber comprising a core material consisting of polyolefin fiber covered by sheath material consisting of another kind of polyolefin and a composite fiber having a partitioned structure wherein different kinds of polyolefin fibers are connected together forming a circular shape. Examples of polyolefin useful in this case are polyethylene and polypropylene.

As for the sheet material containing polyolefin-based synthetic resin fibers, a nonwoven fabric made of the above-mentioned polyolefin fibers, a woven fabric made of the above-mentioned polyolefin fibers or a composite sheet composed of nonwoven fabric and woven fabric may be used. The nonwoven fabric can be manufactured by means of a dry-laid process, a wet-laid process, a spun bond method or a melt blow method. Among them, the spun bond method and melt blow method are preferable in view of capability of manufacturing a nonwoven fabric constituted by fine fibers, which is effective in preventing short between the positive electrode and the negative electrode. In particular, the nonwoven fabric consisting of polyolefin fiber having a mean fiber diameter of 0.1 to 15 μm is preferable in view of preventing short between the positive electrode and the negative electrode.

The hydrophilic portion of the separator may preferably be formed by graft-polymerizing a vinyl monomer having a hydrophilic group which has been adhered in advance on the surface of the sheet material. Examples of a vinyl monomer having a hydrophilic group are acrylic acid, methacrylic acid, esters of acrylic acid or methacrylic acid, vinylpyridine, vinylpyrrolidone, styrene sulfonate, styrene, other compounds having a functional group which is capable of forming a salt through a reaction with an acid or base, or a functional group which is capable of forming a salt through a hydrolysis after being graft-polymerized. Among these vinyl monomers, acrylic acid is most preferable.

The ratio of the graft-copolymerization of the vinyl monomer for forming a hydrophilic portion on the sheet material should preferably be 0.2 to 2.0 meq/g (milli-equivalent per gram) as measure by means of potassium ion exchange capacity to be determined by the titration explained below. If the ion exchange capacity is less than 0.2 meq/g, the ratio of the graft-polymerization at the hydrophilic portion of the separator 3 becomes too low so that the liquid retention of the separator 3 may be lowered. On the other hand, if the ion exchange capacity exceeds over 2.0 meq/g, the operation voltage may be lowered in the occasion of discharging a great amount of electric current in the nickel-hydrogen secondary battery provided with a separator.

(Titration process)

First, 0.5 to 1 g of a sample (for example, a polyolefin nonwoven fabric which has been subjected to graft-polymerization with acrylic acid) is taken into a 100 ml polyethylene wide-mouthed bottle and 100 ml of 1N—HCl solution was introduced into the bottle. After sinking completely the sample into the solution if the sample is still floating on the surface of the solution, the resultant mixture was left to stand for one hour in a thermostatic chamber kept at a temperature of 60° C. Subsequently, the sample is transferred into a beaker containing 200 ml of ion-exchanged water, and then stirred with a glass rod to wash the sample while exchanging the ion-exchanged water until the pH of the washing liquid becomes 6 to 7. After finishing the washing, the water is removed from the sample, spread over the surface of a stainless steel tray, and then dried in a desiccator cabinet kept at a temperature of 100° C. for one hour. After drying the sample, the weight of the sample is measured up to 0.1 mg, and then taken into a 100 ml polyethylene wide-mouthed bottle to which is then added 110 g±0.01 g of 0.01N—KOH. On the other hand, 110 g±0.01 g of 0.01N—KOH as a blank sample is put into a 100 ml polyethylene wide-mouthed bottle. Thereafter, these bottles are housed in a thermostatic chamber kept at a temperature of 60° C. for two hours while gently stirring the solution in these bottles at every 30 minutes. Subsequently, the bottles are gently shaken and then the samples are taken out of the bottles to be cooled down to room temperature.

After being cooled, 100 g of each sample is transferred to a 200 ml conical beaker measuring the sample up to 0.01 g. Phenolphthalein is used as an indicator, and the sample is subjected to a neutralization titration with 0.1N—HCl solution. The solution of the blank sample is also treated in the same manner and subjected to a neutralization titration with 0.1N—HCl solution. Through this titration the potassium ion exchange capacity is calculated according to the following equation.

$$I.E.C. = [T_2 \times (S_1/S_2) - T_1] / W_1 \times (E_1/S_1) \times 0.1 \times F$$

wherein,

I.E.C.: Potassium ion exchange degree (meq/g).

$T_1$: The amount (ml) of 0.1N—HCl solution required for the titration of the sample solution (ml).

$T_2$: The amount (ml) of 0.1-HCl solution required for the titration of the blank sample solution (ml).

$S_1$: The weight of the sample solution taken out (g).

$S_2$: The weight of the blank sample solution taken out (g).

$W_1$: The weight of the sample solution after drying (g).

$E_1$: The weight of 0.01N—KOH solution added (g).

F: Factor of 0.1N—HCl solution.

The hydrophobic portion of the separator is formed by performing a treatment of the sheet material wherein the graft-polymerization of vinyl monomer having a hydrophilic group is hindered, such for example as an embossing treatment of the sheet material so as to partially turning the sheet material into a film. The shape of the embossing is not restricted to any particular shape, but may be a circle, an angular shape such as a square, or a stripe. The hydrophobic portion of the separator can be formed also by laminating a woven fabric consisting of thick polyolefin fibers on a nonwoven fabric, a fabric or a composite sheet material.

The areal ratio of the hydrophobic portion in second surface of the separator should preferably be 2 to 25%. If the areal ratio is less than 2%, it may be difficult to control the increase of the inner pressure of the secondary battery provided with a separator in the occasion of over-charging. On the other hand, if the areal ratio exceeds over 25%, the operation voltage may be lowered in the occasion of discharging a great amount of electric current in the nickel-hydrogen secondary battery provided with a separator. A more preferable range of areal ratio of the hydrophobic portion is 8 to 20%.

In the first surface of the separator 3, the areal ratio of the hydrophobic portion may be 10% or less. If the hydrophobic portion is to be formed on the first surface of the separator, the areal ratio of the hydrophobic portion should be less than that of the first surface of the separator. When a separator having such a structure as explained above is interposed between the paste-type positive electrode and the paste-type negative electrode in such a manner that the second surface of thereof is faced toward the negative electrode, i.e., the first surface of thereof is faced toward the positive electrode, it is possible to retain a greater amount of alkali electrolyte on the positive electrode side of the separator (the first surface) rather than on the negative electrode side. As a result, a sufficient amount of electrolyte membrane can be formed on the surface of the positive electrode, so that it is possible, due to the interfering action of the electrolyte membrane, to prevent hydrogen gas generated from the negative electrode from passing through the separator into the positive electrode thereby inhibiting the self-discharge even if the nickel-hydrogen secondary battery provided with a positive electrode, a separator and a negative electrode is stored in a high temperature atmosphere.

It is preferable to control the thickness of the separator 3 to a range of 0.15 mm to 0.3 mm.

The weight per unit area of the separator 3 should preferably be 30 g/m$^2$ to 70 g/m$^2$. If the weight per unit area of the separator 3 is less than 30 g/m$^2$, the strength of the separator 3 may be undesirably lowered. On the other hand, if the weight per unit area of the separator 3 exceeds over 70 g/m$^2$, the capacity of the battery may be lowered. A more preferable range of the weight per unit area of the separator 3 is 40 mg/m$^2$ to 60 g/m$^2$.

The separator 3 can be manufactured by the following methods (1) and (2) for example.

(1) First, an embossing treatment is selectively performed on one surface out of a first surface 22 and a second surface 23, i.e. on the first surface 22 of a sheet material 21 (for example a nonwoven fabric) containing polyolefin synthetic resin fibers as shown in FIGS. 2 to 4. With this embossing treatment, a plurality of circular depressed portions 24 are formed on the sheet material 21 and at the same time the bottom of the depressed portions 24 is transformed into a film-like portion 25 (film portion). Concurrently, a portion of the second surface 23 that corresponds to the depressed portions 24 is also transformed into a film-like portion.

Then, the sheet material is dipped into a solution containing vinyl monomer having a hydrophilic group, and then withdrawn out of the solution. In this treatment, the both of the first and second surface portions which correspond to the film portion 25 are prevented from being coated with the solution, since the these portion are turned into a film 25 as shown in FIG. 3. The surface portions of the first and second surface 22 and 23 of the nonwoven fabric excluding the first and second surface portions which correspond to the film portion 25 are adhered with the solution. In this case, since the depressed portions 24 of the film 25 can be filled with the solution, the whole surface of the depressed portions 24 is contacted with the solution.

Then, an energy beam is irradiated onto the sheet material thereby causing the graft-polymerization of the vinyl monomer at the portions where the solution is adhered. With this polymerization treatment, the whole surface of the first surface of the sheet material is made hydrophilic through the graft-polymerization of the vinyl monomer, whereas in the second surface, the film portion corresponding to the bottom portion of the depressed portions 24 is prevented from being adhered with the solution and other portions excluding this film portion are adhered with the solution, so that only the film portion is remained to be hydrophobic and the other portions are made hydrophilic.

With these processes, a sheet material containing a polyolefin synthetic resin fiber is formed and at the same time a separator having a first surface made hydrophilic and a second surface having a hydrophobic portion and a hydrophilic portion can be obtained.

The embossing treatment on the first surface of the sheet material can be performed by using an apparatus comprising a pair of parallel rolls, each being adapted to be rotated opposite direction to each other, i.e. a first roll having a smooth surface and a second roll having a plurality of pinpoint-shaped projections. In the operation of this apparatus, these rolls are heated to 120° to 180° C. for instance and the sheet material is forced to pass through the space between these rolls to press and thermally fuse the polyolefin synthetic resin fibers of the sheet material thereby forming an emboss pattern. The shape of the projections to be formed on the surface of the second roll is not restricted to the pinpoint shape, but any other shape such as square or rhomboid shape may be adopted.

As the energy beam, an ultra-violent ray, an electron beam, an X-ray, and other ionizing radiation can be employed.

(2) First, a sheet material is prepared by super-imposing and adhering a large meshed fabric consisting of thick polyolefin synthetic resin fibers on one of the surfaces of nonwoven fabric consisting of polyolefin synthetic resign fibers. In this sheet material, the surface which is not adhered with the fabric is defined as a first surface and the surface which is adhered with the fabric is defined as a second surface. This sheet material is dipped into a solution containing vinyl monomer having a hydrophilic group, and then withdrawn out of the solution. In this treatment, the second surface portions adhering the fabric of thick fibers are prevented from being coated with the solution. However a portion of nonwoven fabric exposing through the mesh of fabric constituting the second surface and first surface consisting of the nonwoven fabric are adhered with the solution.

Then, an energy beam is irradiated onto the sheet material thereby causing the graft-polymerization of the vinyl monomer at the portions where the solution is adhered. With this polymerication treatment, the whole surface of the first surface of the sheet material is made hydrophilic through the graft-polymerization of the vinyl monomer. On the other hand, since a portion of the nonwoven fabric exposing out of the mesh of the fabric constituting the second surface is adhered with the solution, only the exposed portion is made hydrophilic through the graft-polymerization. Namely, in the second surface, the portion formed of the woven fabric is remained to be hydrophobic, and the other portion is made hydrophilic.

With these processes, a sheet material containing a polyolefin synthetic resin fiber is formed and at the same time a separator having a first surface made hydrophilic and a second surface having a hydrophobic portion and a hydrophilic portion can be obtained.

(4) Alkali electrolyte

Examples of the alkali electrolyte are mixed solution of sodium hydroxide (NaOH) and lithium hydroxide (LiOH), a mixed solution of potassium hydroxide (KOH) and LiOH, and a mixed solution of NaOH, KOH and LiOH.

In the embodiment shown in FIG. 1, the separator 3 is interposed between the positive and negative electrodes 2, 4, and resultant structure is spirally wound and accommodated in the bottomed cylindrical case 1. However, the nickel-hydrogen secondary battery of this invention is not limited to such a construction. It is also possible to construct a nickel-hydrogen secondary battery in a rectangular shape which is adapted to accommodate an assembly comprising a plurality of laminates, each laminate being composed of a positive electrode, a negative electrode and a separator disposed between the positive and negative electrodes. The separator has a first surface being hydrophilic and a second surface located opposite to the first surface, and having a hydrophilic portion and a hydrophobic portion. The separator is interposed between the positive and negative electrodes in such a manner that the second surface is faced toward the negative electrode.

As explained above, the nickel-hydrogen secondary battery according to the present invention comprises;

a positive electrode containing a nickel hydroxide;

a negative electrode containing a hydrogen-absorbing alloy;

a separator interposed between the positive electrode and the negative electrode, and an alkali electrolyte;

wherein the separator is formed of a sheet material which comprises fibers including polyolefin-based synthetic resin fibers having an ion-exchange group and satisfies the following equations (1) and (2):

$$(0.05X+0.05) \leq Y \leq 2.0 \tag{1}$$

$$1 \leq X \leq 20 \tag{2}$$

wherein Y in the equation (1) represents potassium ion-exchange capacity (meq/g) and X in the equations (1) and (2) represents an average diameter (μm) of the fibers; and the electrolyte comprises at least either lithium hydroxide or sodium hydroxide.

The present invention can be applied to the cylindrical nickel-hydrogen secondary battery shown in FIG. 1.

However, the nickel-hydrogen secondary battery of this invention is not limited to such a construction. It is also possible to construct a nickel-hydrogen secondary battery in a rectangular shape which is adapted to accommodate an assembly comprising a plurality of laminates, each laminate being composed of a positive electrode, a negative electrode and a separator disposed between the positive and negative electrodes.

With respect to the positive electrode and the negative electrode, the same materials as explained with reference to the aforementioned nickel-hydrogen secondary battery may be employed.

The followings are explanations on the aforementioned separator and alkali electrolyte.

(1) The separator

As for the sheet material comprising fibers, a nonwoven fabric, a woven fabric or a composite sheet composed of nonwoven fabric and woven fabric may be used.

The fibers may be formed only of polyolefin-based synthetic resin fibers having an ion-exchange group, or may additionally contain polyolefin-based synthetic resin fibers not having an ion-exchange group.

Examples of polyolefin-based synthetic resin fibers are polyolefin monofilaments, a composite fiber having a core-sheath structure wherein the surface of polyolefin fiber core is covered by another kind of polyolefin fibers, a composite fiber having a partitioned structure wherein different kinds of polyolefin fibers are connected together forming a circular shape, and fibers of a copolymer comprising polyolefin and butene. Examples of polyolefin useful in this case are polyethylene and polypropylene.

If the sheet material comprising fibers is to be formed from the aforementioned composite sheet, the average diameter (thickness) of the fibers of each layer constituting the composite sheet may be the same with or different from each other.

The composite sheet should preferably be formed of a 3-ply structure which comprises a core layer consisting mainly of fibers including polyolefin-based synthetic fibers having an ion-exchange group and two surface layers each consisting mainly of fibers including polyolefin-based synthetic fibers having an ion-exchange group and disposed on both surfaces the core layer, wherein the average diameter of the fibers constituting the surface layers is made larger than the average diameter of the fibers constituting the core layer. The average diameter of the fibers constituting each surface layers may be the same with or different from each other.

When the separator is formed of such a 3-ply structure and constructed to satisfy the aforementioned equations (1) and (2), a sufficient strength would be assured by the surface layers and at the same time a large amount of electrolyte can be sustained by the core layer, thus making it possible to provide a separator having a high strength and an excellent electrolyte-retaining property. A nickel-hydrogen secondary battery provided with such a separator and with an alkali electrolyte of specific composition will exhibits a highly improved self-discharge property during the storage thereof at a high temperature.

The average diameter of the fibers constituting the core layer in the aforementioned 3-ply structure sheet should preferably be in the range of 0.5 to 5 μm, while the average diameter of the fibers constituting the surface layers should preferably be in the range of 7 to 20 μm.

The reasons for limiting the average diameter of the fibers of the core layer are as follows. Namely, if the average diameter of the fibers is less than 0.5 μm, the strength of the separator would be deteriorated as such that the resultant separator may become useless. On the other hand, if the average diameter of the fibers exceeds over 5 μm, the electrolyte-retaining property of the separator may be undesirably lowered. Therefore, a preferable range of the average diameter of fibers in the core layer is 1 μm to 3 μm.

On the other hand, the reasons for limiting the average diameter of the fibers of the surface layers are as follows. Namely, if the average diameter of the fibers is less than 7 μm, the strength of the separator would be deteriorated as such that the resultant separator may become useless. On the other hand, if the average diameter of the fibers exceeds over 20 μm, the electrolyte-retaining property of the separator may be undesirably lowered. Therefore, a preferable range of the average diameter of fibers in the surface layers is 8 μm to 15 μm.

Examples of the ion-exchange group are COOH group, $SO_3H$ group, or OH group. If the polyolefin-based synthetic resin fibers have OH group, the OH group should preferably have a high acidity. Among these ion-exchange groups, COOH group is most preferable.

The ion-exchange group of the polyolefin-based synthetic resin fibers may be formed by the graft-copolymerization of vinyl monomer having an ion-exchanging capacity.

Examples of a vinyl monomer useful in this case are acrylic acid monomer, methacrylic acid monomer, acrylate or methacrylate monomer, vinylpyridine monomer, vinylpyrrolidone monomer, styrene sulfonate monomer, a vinyl monomer having a functional group which is capable of forming a salt through a reaction with an acid or base such as styrene monomer, or a vinyl monomer having a functional group which is capable of forming a salt through a hydrolysis. Among these vinyl monomers, acrylic acid monomer is most preferable.

The separator is required to satisfy the following equations (1) and (2), wherein the potassium ion-exchange capacity representing the amount of the ion-exchange group of the separator that can be calculated by the aforementioned titration process is defined as Y meq/g (milli-equivalent per gramme), and the average diameter of the fibers constituting the sheet material is defined as X μm:

$$(0.05X+0.05) \leq Y \leq 2.0 \quad (1)$$

$$1 \leq X \leq 20 \quad (2).$$

The average diameter X (μm) of the fibers constituting the sheet material should preferably be in the range of 1 to 20 μm. When the aforementioned average diameter X (μm) is decreased with the weight per unit area and thickness of the separator being kept constant, the fibers are caused to be entangled closely with each other, thereby minimizing the mesh of the separator, resulting in an increase of the electrolyte-retaining capacity, i.e. an improvement in electrolyte-retaining property of the separator. As the aforementioned average diameter X (μm) is decreased however, the strength of the separator is correspondingly lowered. On the other hand, if the aforementioned average diameter X (μm) is increased with the weight per unit area and thickness of the separator being kept constant, the strength of the separator will be increased. But the fibers are caused to be entangled more loosely with each other, thereby enlarging the mesh of the separator, resulting in a decrease of the electrolyte-retaining capacity, i.e. the deterioration of the electrolyte-retaining property of the separator. Furthermore, if the mesh of separator is too large, the shielding performance of the separator will be deteriorated. Thus, if the aforementioned average diameter X (μm) is less than 1 μm, the deterioration in mechanical strength of the separator becomes too prominent so that the fabrication of battery may become difficult. On the other hand, if the aforementioned average diameter X (μm) exceeds over 20 μm, the shielding performance of the separator may be so deteriorated that a short circuit may be frequently induced between the positive electrode and the negative electrode. Therefore, a more preferable range of the average diameter X is 3 to 15 μm.

Since the mesh of separator will be getting larger as the average diameter X (μm) is increased with the weight per unit area and thickness of the separator being kept constant as mentioned above, the amount of the electrolyte held in the mesh would be decreased, resulting in the deterioration of the electrolyte-retaining property of the separator. Accordingly, in order to improve the self-discharge property during the storage at a high temperature by enabling the separator to retain a sufficient volume of an electrolyte, it is required to increase the ratio of ion-exchange group in the separator in proportion to an increase in the average diameter X (μm) of fibers so as to enhance the hydrophilicity of the fibers per se thereby allowing the separator to retain a sufficient volume of electrolyte even if the mesh thereof is rather large. Namely, the minimum value of the potassium ion-exchange capacity Y (meq/g) requiring for improving the self-discharge property during the storage at a high temperature is required to be increased in accordance with the equation of (0.05X+0.05) when the average diameter X (μm) of fibers is increased. If the potassium ion-exchange capacity Y (meq/g) of the separator is lower than the potassium ion-exchange capacity as defined by the equation of (0.05X+0.05), the hydrophilicity of the separator will be deteriorated, thus decreasing the electrolyte-retaining capacity and resulting in the deterioration of the self-discharge property during the storage at a high temperature. On the other hand, if the potassium ion-exchange capacity Y (meq/g) of the separator exceeds over 2.0 meq/g, the ion exchange capacity of the separator will be enhanced, thus causing the alkali metal ions in the electrolyte to be fixed onto the separator, resulting in the lowering of operation voltage of a nickel-hydrogen secondary battery provided with this separator at the occasion of a large current discharge. Therefore, the potassium ion-exchange capacity Y (meq/g) as determined by the titration process should preferably be confined to meet the following equation (3).

$$(0.05X+0.15) \leq Y \leq 1.2 \tag{3}$$

The thickness of the separator should preferably be in the range of 0.15 mm to 0.3 mm.

The weight per unit area of the separator should preferably be 30 $g/m^2$ to 70 $g/m^2$. If the weight per unit area of the separator is less than 30 $g/m^2$, the strength of the separator may be undesirably lowered. On the other hand, if the weight per unit area of the separator exceeds over 70 $g/m^2$, the capacity of the battery may be lowered. A more preferable range of the weight per unit area of the separator is 40 $g/m^2$ to 60 $g/m^2$.

The separator can be manufactured by any of the following methods (a) to (c) for example.

(a) First, a sheet material made of polyolefin-based synthetic fibers having an average diameter ranging from 1 to 20 μm is dipped into a solution containing vinyl monomer having an ion-exchanging capacity, and then pulled out of the solution. Then, an energy beam is irradiated onto the sheet material thereby to allow the vinyl monomer to be graft-copolymerized. With this treatment, a separator formed of a sheet material comprising fibers including a polyolefin-based synthetic resin fibers having an ion-exchange group, and meeting the aforementioned equations (1) and (2) can be obtained.

(b) First, an energy beam is irradiated onto a sheet material made of polyolefin-based synthetic fibers having an average diameter ranging from 1 to 20 μm, and then the resultant sheet material is dipped into a solution containing vinyl monomer having an ion-exchanging capacity, thereby to allow the vinyl monomer to be graft-copolymerized. With this treatment, a separator formed of a sheet material comprising fibers including a polyolefin-based synthetic resin fibers having an ion-exchange group, and meeting the aforementioned equations (1) and (2) can be obtained.

(c) First, a sheet material made of polyolefin-based synthetic fibers having an average diameter ranging from 1 to 20 μm is dipped into a solution containing vinyl monomer having an ion-exchanging capacity, and simultaneously, an energy beam is irradiated onto the sheet material thereby to allow the vinyl monomer to be graft-copolymerized. With this treatment, a separator formed of a sheet material comprising fibers including a polyolefin-based synthetic resin fibers having an ion-exchange group, and meeting the aforementioned equations (1) and (2) can be obtained.

As for the sheet material made of polyolefin-based synthetic fibers having an average diameter ranging from 1 to 20 μm and no ion-exchange group, a nonwoven fabric made of these fibers, a woven fabric made of these fibers or a composite sheet composed of these nonwoven fabric and woven fabric may be used. The nonwoven fabric can be manufactured by means of a dry process, a wet process, a spun bond method or a melt blow method. Among them, the spun bond method and melt blow method are preferable in view of possibility of manufacturing a nonwoven fabric constituted by fine fibers, which is effective in preventing the short circuit between the positive electrode and the negative electrode.

With respect to the composite sheet, it is possible to employ a 3-ply structure comprising a core layer comprising the polyolefin-based synthetic fibers and two surface layers each comprising the polyolefin-based synthetic fibers and disposed on both surfaces the core layer, wherein the average diameter of the fibers constituting the surface layers is made larger than the average diameter of the fibers constituting the core layer. The average diameter of the fibers constituting each surface layers may be the same with or different from each other.

As for the energy beam, the same kinds of energy beam as explained above may be employed.

A first surface of the separator may preferably be hydrophilic, and a second surface of the separator which is opposite to the first surface may preferably have a hydrophilic portion and a hydrophobic portion. The separator constructed in this manner may be disposed between the positive electrode and the negative electrode such that the second surface thereof faces the negative electrode.

The term "hydrophilic portion" means that surface region of the separator in which the ion-exchange groups are present. The term "hydrophobic portion" means that surface region of the separator in which no ion-exchange groups are present.

The aforementioned hydrophobic portion of the separator can be formed by treating the sheet material in a manner to hinder the graft-polymerization of vinyl monomer having an ion-exchange group, for example by performing an embossing treatment to the sheet material so as to turn a portion of the sheet material into a film. The shape of the embossing in this case is not restricted to any particular shape, but may be a circle, an angular shape such as a square, or a stripe. The hydrophobic portion of the separator can be formed also by laminating a woven fabric consisting of thick polyolefin fibers on a nonwoven fabric, a fabric or a composite sheet material.

The areal ratio of the hydrophobic portion in the second surface of the separator should preferably be limited to 2 to 25%. If this areal ratio is less than 2%, it may be difficult to expect the effect to be brought about by provision of the hydrophobic portion, i.e. the effect of inhibiting an increase of the inner pressure of the secondary battery at the occasion of over-charging. On the other hand, if the areal ratio of the hydrophobic portion exceeds over 25%, the operation voltage may be lowered at the occasion of discharging a large current from the nickel-hydrogen secondary battery provided with this separator. Therefore, a more preferable range of areal ratio of the hydrophobic portion is 8 to 20%.

The ion-exchange group may be present all over the first surface (or first main surface) of the separator, or the areal ratio of the hydrophobic portion of the first surface of the separator may be 10% or less. If the first surface of the separator has the hydrophobic portion, the areal ratio of the hydrophobic portion should be smaller than that on the second surface (or second main surface) of the separator. When a separator constructed in this manner is interposed between a paste-type positive electrode and a paste-type negative electrode in such a manner that the second surface thereof faces the negative electrode, i.e. the first surface thereof faces the positive electrode, it is possible to retain a greater amount of alkali electrolyte on the positive electrode side (the first main surface) of the separator as compared with that on the negative electrode side. As a result, an electrolyte membrane can be formed on the surface of the positive electrode, or the electrolyte membrane formed already on the surface of the positive electrode can be densified, so that it is possible to prevent hydrogen gas generated from the negative electrode from passing through the separator and reaching the positive electrode during the storage at a high temperature of the nickel-hydrogen secondary battery. Accordingly, the self-discharge properties of the nickel-hydrogen secondary battery can be extremely improved.

The following methods (1) and (2) explains the method of manufacturing this separator which is formed of a sheet material comprising fibers including a polyolefin-based synthetic resin fibers having an ion-exchange group and constructed such that a first surface thereof is hydrophilic and a second surface thereof has a hydrophilic portion and a hydrophobic portion, the separator being additionally constructed to meet the aforementioned equations (1) and (2).

(1) First, an embossing treatment is performed on the first surface of a sheet material (for example a nonwoven fabric) consisting of a polyolefin-based synthetic resin fibers having an average diameter ranging from 1 to 20 µm. With this embossing treatment, a plurality of circular depressed portions are formed on the sheet material and at the same time the bottom of each depressed portion (embossed portion) is transformed into a film-like portion (film portion). Concurrently, a portion of the second surface that corresponds to the bottom of each depressed portion is also transformed into a film-like portion.

Then, the sheet material is dipped into a solution containing vinyl monomer having an ion-exchange group, and then pulled out of the solution. In this treatment, the both of the first and second surface portions which correspond to the film portion are prevented from being coated with the solution, since the these portion have been turned into a film. Namely, the nonwoven fabric portions of the first and second surfaces excluding the film portions of the first and second surfaces are adhered with the solution. In this case however, since the depressed portions are also filled with the solution, the surfaces of the depressed portions are also substantially contacted with the solution.

Then, an energy beam is irradiated onto the sheet material whereby causing the graft-polymerization of the vinyl monomer to occur at the portions where the solution is adhered. With this treatment, the entire surface of the first surface of the sheet material where the depressed portions are formed is made hydrophilic through the graft-polymerization of the vinyl monomer. Whereas, the film portions in the second surface, which corresponds to the depressed bottom portions, are prevented from being adhered with the solution. Namely, the other portions excluding the film portions in the second surface are adhered with the solution, resulting in that the film portions are made hydrophobic and the other portions are made hydrophilic.

As a result of these treatments, it is possible to manufacture a separator which is formed of a sheet material comprising fibers including polyolefin-based synthetic resin fibers having an ion-exchange group and has a hydrophilic first surface and a second surface having hydrophilic and hydrophobic portions, and at the same time constructed to meet the aforementioned equations (1) and (2).

The embossing treatment on the first surface of the sheet material can be performed in the same manner as explained above.

(2) First, a sheet material consisting of polyolefin synthetic resin fibers having an average diameter ranging from 1 to 20 µm is prepared by superimposing and adhering a large meshed fabric consisting of thick polyolefin synthetic resin fibers on one of the surfaces of nonwoven fabric consisting of polyolefin synthetic resin fibers. In this sheet material, the surface which is not adhered with the fabric is defined as a first surface and the surface which is adhered with the fabric is defined as a second surface. This sheet material is then dipped into a solution containing vinyl monomer having an ion-exchange group, and then pulled out of the solution. In this treatment, the fabric constituting the second surface are prevented from being coated with the solution. However, part of the nonwoven fabric exposing through the mesh of fabric constituting the second surface and all of the nonwoven fabric constituting the first surface are adhered with the solution.

Then, an energy beam such as ultraviolet ray is irradiated onto the sheet material thereby causing the graft-polymerization of the vinyl monomer to occur at the portions where the solution is adhered. With this graft-polymerization treatment, the entire surface of the first surface of the sheet material is made hydrophilic through the graft-polymerization of the vinyl monomer. On the other hand, with regard to the second surface of the sheet material where the fabric is attached, since the coating of the solution is limited to the nonwoven fabric portions exposing through the mesh of fabric, the graft-polymerization of the vinyl monomer is also limited to the exposed nonwoven fabric portions. Namely, on the second surface, the portions occupied by the woven fabric are made hydrophobic, and the other portions are made hydrophilic.

As a result, a separator which is formed of a sheet material comprising fibers including polyolefin-based synthetic resin fibers having an ion-exchange group and has a hydrophilic first surface and a second surface having hydrophilic and hydrophobic portions, and at the same time constructed to meet the aforementioned equations (1) and (2) can be manufactured.

(2) Alkali electrolyte

The aforementioned electrolyte comprises at least either lithium hydroxide (LiOH) or sodium hydroxide (NaOH). Examples of such an electrolyte are an aqueous solution of lithium hydroxide, an aqueous solution of sodium hydroxide, a mixed solution of potassium hydroxide (KOH) and lithium hydroxide, a mixed solution of potassium hydroxide and sodium hydroxide, a mixed solution of potassium hydroxide, lithium hydroxide and sodium hydroxide, and a mixed solution of lithium hydroxide and sodium hydroxide.

If the electrolyte contains at least lithium hydroxide, the concentration of lithium hydroxide in the aforementioned electrolyte should preferably be in the range of 0.1N to 1.5N. If the concentration of lithium hydroxide falls outside this range, the self-discharge property during the storage at a high temperature of a nickel-hydrogen secondary battery may be deteriorated. Therefore, a preferable range of the concentration of lithium hydroxide is 0.3N to 1.3N.

If the electrolyte contains at least sodium hydroxide, the concentration of sodium hydroxide in the aforementioned electrolyte should preferably be in the range of 0.5N to 6.0N. If the concentration of lithium hydroxide falls outside this range, the self-discharge property during the storage at a high temperature of a nickel-hydrogen secondary battery may be deteriorated. Therefore, a preferable range of the concentration of sodium hydroxide is 1.0N to 5.0N.

As explained above, the nickel-hydrogen secondary battery according to the present invention comprises; a case a paste-type positive electrode accommodated in the case and containing nickel hydroxide and a polymeric binder, a paste-type negative electrode accommodated in the case and containing a hydrogen-absorbing alloy and a polymeric binder, a separator accommodated in the case in such a manner as to be interposed between the positive and negative electrodes, and an alkali electrolyte accommodated in the case; wherein the separator is formed of a sheet material containing polyolefin-based synthetic resin fibers and has a first surface being made hydrophilic and a second surface located opposite to the first surface, and having a hydrophilic portion and a hydrophobic portion, the separator being interposed between the positive and negative electrodes in such a manner that the second surface faces toward the negative electrode.

With this construction, it has become possible to produce a three-phase boundary on the surface of the negative electrode contacting with the second surface of the separator which is provided with a hydrophilic portion and a hydrophobic portion. As a result, the consumption rate of oxygen gas, which is generated during an over-charging, in the negative electrode is prominently increased so that the inner pressure of the battery can be greatly reduced. Further, since the absorption rate of hydrogen gas to be generated from the positive electrode in the occasion of a reverse charging can be remarkably increased through the effect of the three-phase boundary thus produced, it has become possible to lower the inner pressure of the battery in the occasion of the reverse charging.

When a separator having such a structure as explained above is interposed between the paste-type positive electrode and the paste-type negative electrode in such a manner that the first surface of thereof faces toward the positive electrode, it is possible to retain a greater amount of alkali electrolyte on the positive electrode side of the separator (the first surface) rather than on the negative electrode side. As a result, a sufficient amount of electrolyte membrane can be formed on the surface of the positive electrode, so that it is possible, due to the interfering action of the electrolyte membrane, to prevent hydrogen gas generated from the negative electrode from passing through the separator into the positive electrode thereby inhibiting the self-discharge.

Therefore, with the provision of the separator constructed in this manner, it has become possible according to this invention to secondary battery in such a manner as to be increased at the positive electrode side, the hydrophobic portion being disposed at the negative electrode side. Accordingly, it has become possible to provide an excellent secondary battery which is capable of inhibiting the self-discharge during a high temperature storage of the secondary battery and at the same time inhibiting the increase in inner pressure in the occasion of over-charging.

Further, it has become possible according to the nickel-hydrogen secondary battery of this invention to retain the electrolyte for a long period of time, and to control the increase of inner resistance due to the decrease of the electrolyte.

Since the separator to be used in this invention is provided with a hydrophilic portion which is formed by the graft-copolymerization of the vinyl monomer having a hydrophilic group and the ratio of the graft-copolymerization is controlled to 0.2 to 2.0 meq/g (milli-equivalent per gram) as measured by means of potassium ion exchange capacity to be determined by the titration explained above, it has become possible to improve the retention of the electrolyte and therefore to obtain a nickel-hydrogen secondary battery having a sufficiently decreased inner resistance.

It is possible according to this invention to easily prepare a separator which is formed of a sheet material containing polyolefin-based synthetic resin fibers and has a first surface being made hydrophilic and a second surface having hydrophilic and hydrophobic portions by the process comprising the steps of embossing a first surface of a sheet material containing polyolefin-based synthetic resin fibers thereby forming an embossed film portion; dipping the sheet material into a solution containing a vinyl monomer having a hydrophilic group so as to attaching the solution to the first surface and a second surface which is opposite to the first surface except the embossed film portion; and irradiating an energy beam onto the sheet material thereby graft-polymerizing said vinyl monomer attached to the sheet material.

Since the separator is disposed between the paste-type positive electrode and the paste-type negative electrode in such a manner that the second surface faces toward the negative electrode, it is possible to manufacture a nickel-hydrogen secondary battery which is capable of inhibiting the self-discharge during a high temperature storage of the secondary battery, and at the same time inhibiting the increase in inner pressure in the occasion of over-charging and the increase in inner resistance due to the decrease of the electrolyte.

This invention further provides as another embodiment a nickel-hydrogen secondary battery comprising; a positive electrode containing nickel hydroxide; a negative electrode containing hydrogen-absorbing alloy; a separator interposed between the positive electrode and the negative electrode, and an alkali electrolyte;

wherein the separator is formed of a sheet material comprising fibers including polyolefin-based synthetic resin fibers having an ion-exchange group and satisfies the following equations (1) and (2):

$$(0.05X+0.05) \leq Y \leq 2.0 \tag{1}$$

$$1 \leq X \leq 20 \tag{2}$$

wherein Y in the equation (1) represents potassium ion-exchange capacity (meq/g) and X in the equations (1) and (2) represents an average diameter (μm) of the fibers; and the electrolyte comprises at least either lithium hydroxide or sodium hydroxide.

When a nickel-hydrogen secondary battery comprises a separator satisfying the aforementioned equations (1) and (2) and an alkali electrolyte comprising at least either lithium hydroxide or sodium hydroxide, it is possible to inhibit the progress of self-discharge during the storage at a high temperature of the battery. At the same time, it is possible with this nickel-hydrogen secondary battery constructed above to improve the large current discharge property and charge/discharge cycle life of the battery.

When the first surface of separator is hydrophilic and the second surface which is disposed opposite to the first surface has a hydrophilic portion and hydrophobic portion, and the separator thus constructed is disposed between the positive electrode and the negative electrode with the second surface being faced toward the negative electrode, a three-phase interface can be formed at the surface of the negative electrode, thereby making it possible to improve the gas consumption property during the over-charging and reverse-charging of the battery, and at the same time to lower the inner pressure during the over-charging and reverse-charging of the battery. At the same time, since it is also possible with this separator to form an electrolyte membrane on the surface of the positive electrode, or to reinforce the electrolyte membrane formed in advance on the surface of the positive electrode, it has become possible to provide the nickel-hydrogen secondary battery with a function or to improve the function to prevent hydrogen gas generated out of the negative electrode during the high temperature storage of the battery from reaching the positive electrode. Accordingly, it has become possible to quite effectively inhibit the progress of self-discharge during the storage at a high temperature of a nickel-hydrogen secondary battery.

Accordingly, it is possible, with the nickel-hydrogen secondary battery provided with the aforementioned separator, to extremely improve the self-discharge property during a high temperature storage thereof and at the same time to suppress an increase of the inner pressure during the over-charging and reverse-charging of the battery.

These invention will be further explained with reference to preferred examples and drawings.

(EXAMPLE 1)
(Preparation of a paste-type negative electrode)

With the employment of lanthanum-rich misch metal Lm which is available in the market, Ni, Co, Mn and Al, and with the use of a high frequency furnace, a hydrogen-absorbing alloy having a composition of $LmNi_{4.0}Co_{0.4}Mn_{0.3}Al_{0.3}$ was prepared. This hydrogen-absorbing alloy was then pulverized by a mechanical means, and the pulverized material was sieved through a 200 mesh sieve. 100 parts by weight of the hydrogen-absorbing alloy powder thus sieved was mixed with 0.5 part by weight of sodium polyacrylate, 0.125 part by weight of carboxymethyl cellulose (CMC), 2.5 parts by weight of the dispersion of polytetrafluoroethylene (specific gravity: 1.5, solid portion: 60 wt %), 1.0 part by weight of carbon powder (a conductive material) and 50 part by weight of water thereby preparing a paste. This paste was coated over a punched metal, and after being dried, press-molded to form a paste-type negative electrode.

(Preparation of a paste-type positive electrode)

To a mixture consisting of 90 parts by weight of nickel hydroxide powder and 10 parts by weight of cobalt oxide powder are added 0.3 part by weight of carboxymethyl cellulose (CMC) and 0.5 parts by weight (measured as a solid) of the dispersion of polytetrafluoroethylene (specific gravity: 1.5, solid portion: 60 wt %) to obtain a mixture to which 45 parts by weight of demineralized water was added and the mixture was kneaded to prepare a paste. This paste was then filled into a fibrous substrate plated with nickel and then the same paste was coated over the both surfaces of the substrate. After being dried, the substrate was rolled to obtain a paste-type positive electrode.

(Preparation of a separator)

A nonwoven fabric consisting of a mean fiber diameter of 10 μm and having a weight per unit area of 50 g/m² and a thickness of 0.20 mm was prepared by processing polypropylene resin according to a spun bond method. Then, using an apparatus comprising a pair of parallel rolls, each being adapted to be rotated opposite direction to each other, i.e. a first roll having a smooth surface and a second roll having a plurality of pinpoint-shaped projections and heated to 130° C., the nonwoven fabric was forced to pass through the space between these rolls to be pressed and thermally fused, thereby forming an emboss pattern. As a result, a plurality of circular depressions were formed on the nonwoven fabric, and at the same time a plurality of film-like portions (film portion) were formed on the bottom (embossed surface) of the circular depressions. Concurrently, the portions of the second surface which correspond to the embossed surface were turned into a film. The areal ratio of the film portion was 16% based on the whole area of the second surface of the nonwoven fabric. Thereafter, the nonwoven fabric was dipped into an aqueous acrylic acid solution, and then exposed to the irradiation of ultra-violet ray thereby graft-polymerizing the acrylic acid monomer. The resultant nonwoven fabric was washed to remove unreacted acrylic acid, and then dried thereby obtaining a separator.

The embossed first surface of the separator was found as being entirely made hydrophilic. The whole area excepting the film portion of the second surface of the separator was found also as being made hydrophilic and the film portion of the second surface was remained hydrophobic. Namely, both hydrophilic portion and hydrophobic portion (areal ratio:16%) were formed on the second surface of the separator. When the hydrophilic portion of the separator was measured by a titration method to determine the graft-copolymerization ratio of the acrylic acid monomer, the potassium ion exchange capacity was found 0.8 meq/g.

This separator was disposed between positive and negative electrodes in such a manner that the second surface having a hydrophilic portion and a hydrophobic portion of the separator faces to the negative electrode, and the resultant composite was spirally wound to form an electrode group. This electrode group and an electrolyte comprising 7N of KOH and 1N of LiOH were housed in the closed-end cylindrical case to manufacture a cylindrical nickel-hydrogen secondary battery of AA size as shown in FIG. 1.

(EXAMPLE 2)

A nonwoven fabric consisting of a mean fiber diameter of 1 μm and having a thickness of 0.2 mm was prepared by processing polypropylene resin according to a melt-blow method. Then, in the same manner as explained in Example 1, the nonwoven fabric was embossed, and then dipped into an aqueous acrylic acid solution. The wet nonwoven fabric was irradiated with ultra-violet ray thereby graft-polymerizing the acrylic acid monomer. As a result, a separator which has a first surface being entirely made hydrophilic, and a second surface having a hydrophilic portion and a hydrophobic portion was obtained.

When the hydrophilic portion of the separator was measured by a titration method to determine the graft-copolymerization ratio of the acrylic acid monomer, the potassium ion exchange capacity was found 0.8 meq/g.

This separator was disposed between positive and negative electrodes of the same structure as used in Example 1 in such a manner that the second surface of the separator faces to the negative electrode, and the resultant composite was spirally wound to form an electrode group. This electrode group and an electrolyte of the same composition as used in Example 1 were housed in the closed-end cylindrical case to manufacture a cylindrical nickel-hydrogen secondary battery of AA size as shown in FIG. 1.

(EXAMPLE 3)

A fiber having a lower melting point than that of polypropylene resin was prepared by copolymerizing polypropylene resin with butene. 50% by weight of this fiber and 50% by weight of polypropylene resin fiber were mixed together and formed into a nonwoven fabric by a wet-laid process thereby obtaining a nonwoven fabric having a thickness of 0.2 mm. Then, in the same manner as explained in Example 1, the nonwoven fabric was embossed, and then dipped into an aqueous acrylic acid solution. The wet nonwoven fabric was irradiated with ultra-violet ray thereby graft-polymerizing the acrylic acid monomer. As a result, a separator which has a first surface being entirely made hydrophilic, and a second surface having a hydrophilic portion and a hydrophobic portion was obtained.

When the hydrophilic portion of the separator was measured by a titration method to determine the graft-copolymerization ratio of the acrylic acid monomer, the potassium ion exchange capacity was found 0.8 meq/g.

This separator was disposed between positive and negative electrodes of the same structure as used in Example 1 in such a manner that the second surface of the separator faces to the negative electrode, and the resultant composite was spirally wound to form an electrode group. This electrode group and an electrolyte of the same composition as used in Example 1 were housed in the closed-end cylindrical case to manufacture a cylindrical nickel-hydrogen secondary battery of AA size as shown in FIG. 1.

(EXAMPLE 4)

A nonwoven fabric having a thickness of 0.2 mm was prepared by stacking together the nonwoven fabric produced according to the melt-blow method as explained in Example 2 fiber and the nonwoven fabric produced according to the wet-laid process as explained in Example 3. Then, in the same manner as explained in Example 1, the nonwoven fabric was embossed, and then dipped into an aqueous acrylic acid solution. The wet nonwoven fabric was irradiated with ultra-violet ray thereby graft-polymerizing the acrylic acid monomer. As a result, a separator which has a first surface being entirely made hydrophilic, and a second surface having a hydrophilic portion and a hydrophobic portion was obtained. In this embossing process, the embossing was performed from the nonwoven fabric side which was prepared according to the wet-laid process.

When the hydrophilic portion of the separator was measured by a titration method to determine the graft-copolymerization ratio of the acrylic acid monomer, the potassium ion exchange capacity was found 0.8 meq/g.

This separator was disposed between positive and negative electrodes of the same structure as used in Example 1 in such a manner that the second surface of the separator faces to the negative electrode, and the resultant composite was spirally wound to form an electrode group. This electrode group and an electrolyte of the same composition as used in Example 1 were housed in the closed-end cylindrical case to manufacture a cylindrical nickel-hydrogen secondary battery of AA size as shown in FIG. 1.

(EXAMPLE 5)

A nonwoven fabric consisting of a mean fiber diameter of 1 µm and having a weight per unit area of 35 g/m² was prepared by the melt-blow method. On the other hand, another woven fabric having a weight per unit area of 15 g/m² and a rectangular sectional area 500 µm in width was prepared by knitting polypropylene fibers. Then, the nonwoven fabric mentioned above was stacked on the woven fabric prepared above so as to fusion-bonding them, thus obtaining a composite sheet having a weight per unit area of 50 g/m².

After the composite sheet being dipped into an aqueous acrylic acid solution, the wet composite sheet was irradiated with ultra-violet ray thereby graft-polymerizing the acrylic acid monomer. As a result, a separator which has a first surface being constituted by the nonwoven fabric and entirely made hydrophilic, and a second surface having hydrophilic portions constituted by the nonwoven fabric exposed from the open mesh and partially hydrophobic portions constituted by the woven fabric was obtained.

When the hydrophilic portion of the separator was measured by a titration method to determine the graft-copolymerization ratio of the acrylic acid monomer, the potassium ion exchange capacity was found 0.8 meq/g.

This separator was disposed between positive and negative electrodes of the same structure as used in Example 1 in such a manner that the second surface of the separator faces to the negative electrode, and the resultant composite was spirally wound to form an electrode assembly. This electrode assembly and an electrolyte of the same composition as used in Example 1 were housed in the closed-end cylindrical case to manufacture a cylindrical nickel-hydrogen secondary battery of AA size as shown in FIG. 1.

(EXAMPLE 6)

A core-sheath type composite fiber comprising a core material consisting of polypropylene fiber covered by a sheath material consisting of polyethylene was prepared. This composite fiber was mixed with polypropylene fiber having a mean diameter of 10 µm at the ratio of 50:50, and the resultant mixture was formed into a nonwoven fabric by a wet-laid process. Then, in the same manner as explained in Example 1, the nonwoven fabric was embossed, and then dipped into an aqueous acrylic acid solution. The wet nonwoven fabric was irradiated with ultra-violet ray thereby graft-polymerizing the acrylic acid monomer. As a result, a separator which has a first surface being entirely made hydrophilic, and a second surface having a hydrophilic portion and a hydrophobic portion was obtained.

When the hydrophilic portion of the separator was measured by a titration method to determine the graft-copolymerization ratio of the acrylic acid monomer, the potassium ion exchange capacity was found 0.8 meq/g.

This separator was disposed between positive and negative electrodes of the same structure as used in Example 1 in such a manner that the second surface of the separator faces to the negative electrode, and the resultant composite was spirally wound to form an electrode group. This electrode group and an electrolyte of the same composition as used in Example 1 were housed in the closed-end cylindrical case to manufacture a cylindrical nickel-hydrogen secondary battery of AA size as shown in FIG. 1.

(Comparative Example 1)

A core-sheath type composite fiber comprising a core material consisting of polypropylene fiber covered by a sheath material consisting of polyethylene and having a mean diameter of 15 µm was prepared. On the other hand, a core-sheath type composite fiber comprising a core material consisting of polypropylene fiber covered by a sheath material consisting of ethylene-vinylalcohol copolymer and having a mean diameter of 15 µm was prepared. These composite fibers were mixed together and the resultant mixture was treated by a dry-laid process to form a separator consisting of nonwoven fabric having a weight per unit area of 50 g/m² and a thickness of 0.20 mm.

This separator was disposed between positive and negative electrodes of the same structure as used in Example 1, and the resultant composite was spirally wound to form an electrode group. This electrode group and an electrolyte of the same composition as used in Example 1 were housed in the closed-end cylindrical case to manufacture a cylindrical nickel-hydrogen secondary battery of AA size as shown in FIG. 1.

(Comparative Example 2)

A core-sheath type composite fiber comprising a core material consisting of polypropylene fiber covered by a sheath material consisting of polyethylene and having a mean fiber diameter of 15 μm was prepared. This composite fiber was mixed with polypropylene fiber having a mean diameter of 10 μm at the ratio of 50:50, and the resultant mixture was treated by a wet-laid process to form a non-woven fabric having a weight per unit area of 50 g/m² and a thickness of 0.2 mm. The nonwoven fabric was inserted between two polyethylene films, and heat-seal treatment was carried out in both sides of the nonwoven fabric to form circular heat-sealed positions having a diameter of 1 mm in a lattice formation. An areal ratio of the circular heat-sealed potions was 16% in the nonwoven fabric. Then, in the same procedure as explained in Example 1, the nonwoven fabric was dipped into an aqueous acrylic acid solution, and then irradiated with ultra-violet ray thereby graft-polymerizing the acrylic acid monomer attached to the nonwoven fabric expected the circular heat-sealed potions. Thereafter, the polyethylene films was removed to obtain a separator. This separator had a hydrophilic portion and a hydrophobic portion on its either surface, and an areal ratio of hydrophilic portion and hydrophobic portion being 84:16.

When the hydrophobic portion of the separator was measured by titration method of to determine the graft-copolymerization ratio of the acrylic acid monomer, the potassium ion exchange capacity was found 0.8 meq/g.

This separator was disposed between the positive and negative electrodes of the same structure as used in Example 1, and the resultant composite was spirally wound to form an electrode group. This electrode group and an electrolyte of the same composition as used in Example 1 were housed in the closed-end cylindrical case to manufacture a cylindrical nickel-hydrogen secondary battery of AA size as shown in FIG. 1.

These secondary batteries obtained in Examples 1 to 6 and Comparative Examples 1 and 2 were subjected to three cycles of charge/discharge wherein each battery was charged to a depth of 150% with an electronic current of 1.0 CmA and discharged with a cut of 1.0 CmA/1.0V. Subsequently, the batteries were left to stand, after charging them to a depth of 150% with a current of 1 CmA, in a thermostatic chamber kept at a temperature of 45° C. for 14 days. Then, the batteries were allowed to discharge with a current of 1 CmA until the voltages thereof were lowered down to 1.0V and then a discharge capacity (residual capacity) of each battery was measured. The residual ratio of capacity was calculated by the following equation.

The residual capacity ratio (%)=($C_R/C_0$)×100 wherein $C_0$ represents a discharge capacity measured when the voltage was lowered down to 1.0V as a result of discharge of the battery with a current of 1 CmA after the battery is charged to a depth of 150% with a current of 1 CmA before being stored in the thermostatic chamber kept at a temperature of 45° C. for 14 days; and $C_R$ represents a discharge capacity measured immediately after the storage of battery in the thermostatic chamber kept at a temperature of 45° C. for 14 days.

The relationship between the storage period and the residual capacity ratio as calculated from the above equation is shown in FIG. 5. As seen from FIG. 5, the secondary batteries according to Examples of 1 to 6 are superior than the secondary battery in self-discharging property under the condition of a high temperature storage. This can be attributed to the fact that the separators employed in Examples of 1 to 6 are constructed in such a manner that the first surface is entirely made hydrophilic and this hydrophilic first surface is disposed to face the positive electrode so that an electrolyte membrane is formed on the surface of the positive electrode thereby preventing hydrogen gas generated from the paste-type negative electrode containing hydrogen-absorbing alloy during the storage at high temperature from reaching the positive electrode. Therefore, any reducing reaction due to the presence of hydrogen at the positive electrode can be effectively inhibited thereby improving the self-discharge property of the battery during the storage thereof at high temperature.

The secondary battery of Comparative Example 2 has a separator which has a hydrophilic portion and a hydrophobic portion on its either surface. The hydrophobic portions on the surfaces of the separator have the same area. The hydrogen gas generated from the negative electrode passes through the hydrophobic portions of the separator, reaching the positive electrode. The hydrogen gas causes a reducing reaction at the positive electrode, increasing the self-discharge.

Further, the measurement of inner pressure in the secondary batteries obtained in Examples 1 to 6 and Comparative Example 1 was conducted as follows. This measurement of inner pressure was carried out by housing respectively the secondary batteries obtained in Examples 1 to 6 and Comparative Example 1 in the chamber of a pressure measurement apparatus shown in FIG. 6.

Namely, the pressure measurement apparatus is provided with a battery case comprising a main case body 31 made of acrylic resin and cap 32. In the central portion of the main case body 31 is formed a space 33 having the same size of width and height as those of the battery of AA size. In this space 33 is disposed the secondary battery C. The secondary battery C has not a sealing plate. The cap 32 is mounted on the top of the main case body 31 and air-tightly fixed thereon by means of bolt 36 and nut 37 through packing 34 and O-ring 35. On this cap 32 is attached a pressure-detecting device 38. A negative electrode lead 39 and a positive electrode lead 40 extending respectively from the negative electrode and positive electrode are taken out of the main case body 31 through a space between the packing 34 and O-ring 35.

With this pressure measurement apparatus, a measurement of the maximum inner battery pressure of the secondary batteries obtained in Examples 1 to 6 and Comparative Example 1 was carried out when the battery is charged up to the depth of 480% with a current of 0.5 CmA. The results are shown in Table 1 shown below.

TABLE 1

| | Maximum Inner Battery Pressure |
|---|---|
| Example 1 | 4.8 kg/cm² |
| Example 2 | 5.3 kg/cm² |
| Example 3 | 4.2 kg/cm² |
| Example 4 | 5.4 kg/cm² |
| Example 5 | 5.5 kg/cm² |

TABLE 1-continued

| | Maximum Inner Battery Pressure |
|---|---|
| Example 6 | 4.3 kg/cm$^2$ |
| Comp. Example 1 | 12.8 kg/cm$^2$ |

As seen from the Table 1, the secondary batteries according to Examples of 1 to 6 are more effective than the secondary battery in inhibiting the increase of inner pressure in the occasion of over-charging. This can be attributed to the fact that the separators employed in Examples of 1 to 6 are constructed in such a manner that the first surface is entirely made hydrophilic and the second surface has hydrophilic portion and hydrophobic portion, and second surface is disposed to face the negative electrode so that a sufficient amount of the three phase boundary can be distributed on the surface of the negative electrode, the three phase boundary providing a site of reaction of consuming oxygen gas to be generated during over-charging. It was confirmed that this improved characteristics is effective not only in the occasion of over-charging, but also in the occasion of reverse-charging which also causes the generation of hydrogen gas.

The secondary batteries obtained din Examples 1 to 6 and Comparative Example 1 were subjected to repeating cycles of charge/discharge wherein each battery was charged to a depth of 150% with a current of 1.0 CmA and discharged with a cut of 1.0 CmA/1.0V. The discharge capacity of each battery was calculated by measuring the time required for the voltage of battery to be lowered due to discharge with a current of 1.0 CmA down to 1.0V in every cycle.

Figure 7:
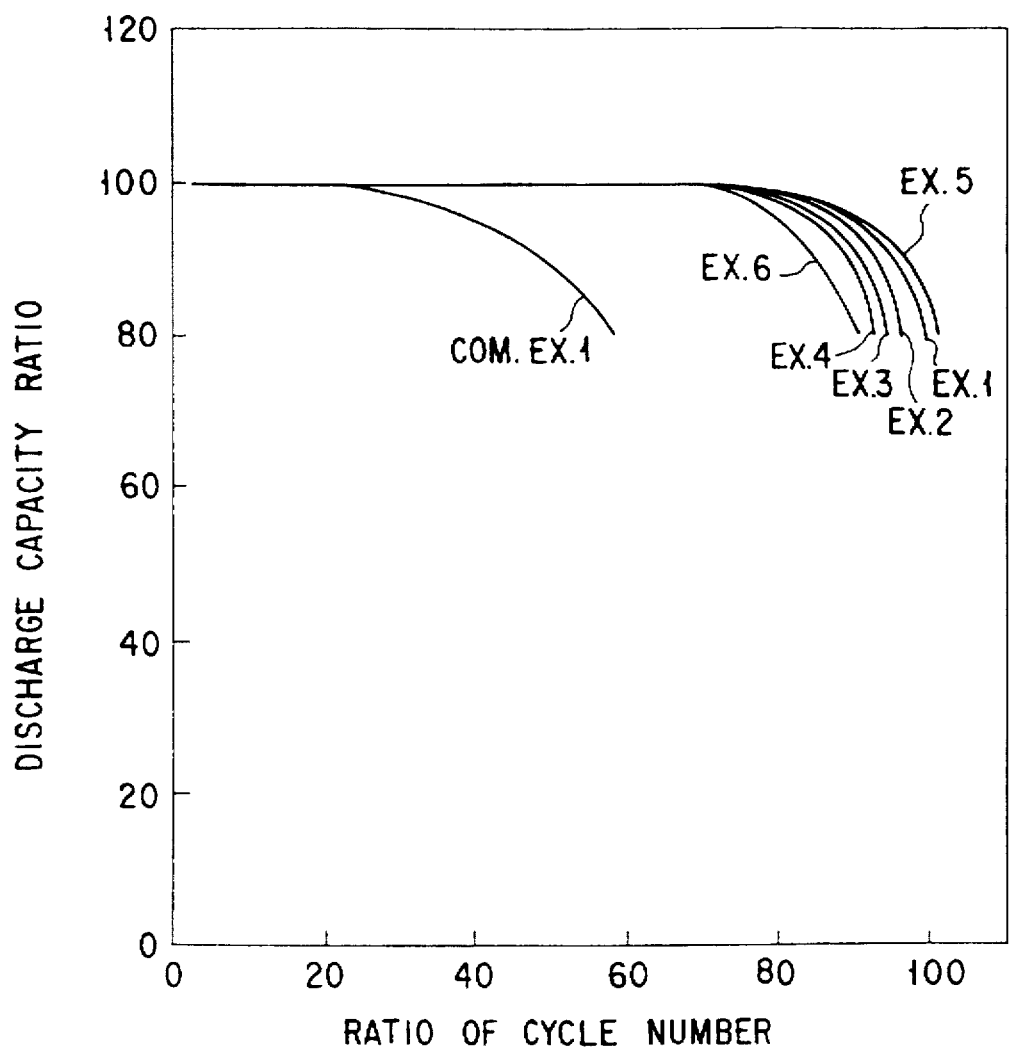
FIG. 7 is a graph showing the relationship between the ratio of cycle number and the ratio of discharge capacity of a nickel-hydrogen secondary battery in Examples 1 to 6 of the present invention and Comparative Example 1.

The results of test on the charge/discharge cycle property are shown in FIG. 7. The discharge capacity representing the axis of ordinate of FIG. 7 is indicated by setting the discharge capacity at the first cycle of Example 1 as being 100, on the basis of which values of the discharge capacity of other cycles in Examples 1 to 6 and Comparative Example 1 are shown. The ratio of cycle number representing the axis of abscissa of FIG. 7 is indicated by setting the cycle number at which a discharge capacity was lowered to 80% of the discharge capacity at the first cycle of Example 1 as being 100, on the basis of which the number of cycles in Examples 1 to 6 and Comparative Example 1 are shown.

As seen from FIG. 7, the charge/discharge cycle life of the secondary batteries according to Examples of 1 to 6 is longer than that of the secondary battery. This can be attributed to the fact that the separators employed in Examples of 1 to 6 are constructed in such a manner that the first surface is entirely made hydrophilic through the graft-copolymerization of acrylic acid monomer, thereby making it possible to assure an excellent retention of electrolyte for a long period of time and inhibit any increase in the inner resistance of the battery.

EXAMPLE 7

(Preparation of a paste-type negative electrode)

A hydrogen-absorbing alloy having a composition of MmNi$_{3.6}$Co$_{0.8}$Mn$_{0.4}$Al$_{0.2}$ was prepared from raw materials comprising misch metal Mm which was available in the market, Ni, Co, Mn and Al by making use of a high frequency furnace. This hydrogen-absorbing alloy was then pulverized by a mechanical means, and the pulverized material was sieved through a 200 mesh sieve. 100 parts by weight of the hydrogen-absorbing alloy powder thus sieved was mixed with 0.4 part by weight of sodium polyacrylate, 0.1 part by weight of carboxymethyl cellulose (CMC), 1.5 parts by weight of the dispersion of polytetrafluoroethylene (specific gravity: 1.5, solid portion: 60 wt %), 0.8 part by weight of carbon powder (a conductive material) and 55 parts by weight of water thereby preparing a paste. This paste was coated over a punched metal, and after being dried, press-molded to form a paste-type negative electrode.

(Preparation of a paste-type positive electrode)

To a powdery mixture consisting of 90 parts by weight of nickel hydroxide powder and 10 parts by weight of cobalt hydroxide powder were added 0.3 part by weight of carboxymethyl cellulose and 1.0 parts by weight (measured as a solid) of the dispersion of polytetrafluoroethylene (specific gravity: 1.5, solid portion: 60 wt %) to obtain a mixture, to which 30 parts by weight of demineralized water was added and then kneaded to prepare a paste. The resultant paste was then filled into a fibrous substrate plated with nickel and then the same paste was coated over the both surfaces of the substrate. After being dried, the substrate was rolled to obtain a paste-type positive electrode.

(Preparation of a separator)

A nonwoven fabric consisting of long fiber 10 μm in average diameter and having a weight per unit area of 50 g/m$^2$ and a thickness of 0.20 mm was prepared by processing polypropylene resin according to a spun bond method. Subsequently, the nonwoven fabric was dipped into an aqueous solution of acrylic acid and then irradiated with ultraviolet rays, thus allowing the acrylic acid monomer to be graft-polymerized. Then, the nonwoven fabric was washed with water to remove unreacted acrylic acid and then dried to obtain a separator.

The separator was formed of a sheet material consisting mainly of a polypropylene fibers having COOH group. The porassium ion exchange capacity of the separator was 0.8 meq/g. The measurement of the ion exchange capacity was performed by the aforementioned titration process.

According to the aforementioned equation (1), (0.05X+ 0.05)≦Y≦2.0, if the average diameter X of the fibers is set to 10 μm, the potassium ion exchange capacity Y falling in the range of 0.55≦Y≦2.0 is required for obtaining an excellent self-discharge property during a high temperature storage and an excellent large current discharge property of the battery. Therefore, the separator obtained in this Example 7 was confirmed, with regard to the average diameter X (μm) and the potassium ion exchange capacity Y (meq/g), to meet both of the aforementioned equations (1) and (2), i.e. 1≦X≦20.

This separator was then disposed between the negative electrode and the positive electrode and the resultant composite was spirally wound to form an electrode group. This electrode group and an alkali electrolyte comprising 7.9N of KOH and 0.1N of LiOH were introduced in the bottomed cylindrical case to manufacture a cylindrical nickel-hydrogen secondary battery of AA size as shown in FIG. 1.

(EXAMPLE 8)

The same procedure as explained in Example 7 was repeated except that a different alkali electrolyte comprising 0.3N of LiOH and 7.7N of KOH was employed in this Example, thereby obtaining a nickel-hydrogen secondary battery of the same type as that of Example 7.

(EXAMPLE 9)

The same procedure as explained in Example 7 was repeated except that a different alkali electrolyte comprising 0.5N of LiOH and 7.5N of KOH was employed in this Example, thereby obtaining a nickel-hydrogen secondary battery of the same type as that of Example 7.

29

(EXAMPLE 10)

The same procedure as explained in Example 7 was repeated except that a different alkali electrolyte comprising 1.0N of LiOH and 7.0N of KOH was employed in this Example, thereby obtaining a nickel-hydrogen secondary battery of the same type as that of Example 7.

(EXAMPLE 11)

The same procedure as explained in Example 7 was repeated except that a different alkali electrolyte comprising 1.3N of LiOH and 6.7N of KOH was employed in this Example, thereby obtaining a nickel-hydrogen secondary battery of the same type as that of Example 7.

(EXAMPLE 12)

The same procedure as explained in Example 7 was repeated except that a different alkali electrolyte comprising 1.5N of LiOH and 6.5N of KOH was employed in this Example, thereby obtaining a nickel-hydrogen secondary battery of the same type as that of Example 7.

(EXAMPLE 13)

The same procedure as explained in Example 7 was repeated except that a different alkali electrolyte comprising 0.5N of NaOH and 7.5N of KOH was employed in this Example, thereby obtaining a nickel-hydrogen secondary battery of the same type as that of Example 7.

(EXAMPLE 14)

The same procedure as explained in Example 7 was repeated except that a different alkali electrolyte comprising 1.0N of NaOH and 7.0N of KOH was employed in this Example, thereby obtaining a nickel-hydrogen secondary battery of the same type as that of Example 7.

(EXAMPLE 15)

The same procedure as explained in Example 7 was repeated except that a different alkali electrolyte comprising 2.0N of NaOH and 6.0N of KOH was employed in this Example, thereby obtaining a nickel-hydrogen secondary battery of the same type as that of Example 7.

(EXAMPLE 16)

The same procedure as explained in Example 7 was repeated except that a different alkali electrolyte comprising 4.0N of NaOH and 4.0N of KOH was employed in this Example, thereby obtaining a nickel-hydrogen secondary battery of the same type as that of Example 7.

(EXAMPLE 17)

The same procedure as explained in Example 7 was repeated except that a different alkali electrolyte comprising 5.0N of NaOH and 3.0N of KOH was employed in this Example, thereby obtaining a nickel-hydrogen secondary battery of the same type as that of Example 7.

(EXAMPLE 18)

The same procedure as explained in Example 7 was repeated except that a different alkali electrolyte comprising 6.0N of NaOH and 2.0N of KOH was employed in this Example, thereby obtaining a nickel-hydrogen secondary battery of the same type as that of Example 7.

(Comparative Example 3)

The same procedure as explained in Example 7 was repeated except that a different alkali electrolyte comprising 8.0N of KOH was employed in this Comparative Example, thereby obtaining a nickel-hydrogen secondary battery of the same type as that of Example 7.

(Comparative Example 4)

A composite fiber comprising a core material consisting of polypropylene fiber covered by a sheath material consisting of polyethylene and having an average diameter of 15 μm was prepared. On the other hand, a composite fiber comprising a core material consisting of polypropylene fiber covered by a sheath material consisting of ethylene-vinyl alcohol copolymer and having an average diameter of 15 μm was prepared. These composite fibers were then mixed together and the resultant mixture was treated by a dry process to form a separator consisting of nonwoven fabric having a weight per unit area of 50 g/m$^2$, a thickness of 0.20 mm and a potassium ion exchange capacity of 0 meq/g. The measurement of the ion exchange capacity of the separator was performed by the aforementioned titration process.

This separator was then disposed between the negative electrode and the positive electrode in the same manner as in the case of Example 7, and the resultant composite was spirally wound to form an electrode group. This electrode group and an alkali electrolyte comprising 8.0N KOH were introduced into the bottomed cylindrical case to manufacture a cylindrical nickel-hydrogen secondary battery of AA size as shown in FIG. 1.

These secondary batteries obtained in Examples 7 to 18 and Comparative Examples 3 and 4 were subjected to three times of charge/discharge cycle at 20° C., each cycle being formulated such that each battery was charged to a depth of 150% with an electronic current of 0.3 CmA and discharged with a cut of 1.0 CmA/1.0 V. Subsequently, the batteries were left to stand for two hours at a temperature of 20° C. after being charged to a depth of 150% with a current of 1 CmA, and then stored in a thermostatic chamber kept at a temperature of 40° C. for 14 days. After this storage, the batteries were left to stand for two hours at a temperature of 20° C., then allowed to discharge with a current of 1 CmA until the voltages thereof were lowered down to 1.0 V and then a discharge capacity (residual capacity) of each battery was measured. The residual capacity ratio was calculated by the following equation. The self-discharge property of each battery was determined from this residual capacity ratio.

Residual capacity ratio $(\%) = (C'_R/C'_0) \times 100$ wherein $C'_0$ represents a discharge capacity measured when the voltage was lowered down to 1.0 V as a result of discharge of the battery with a current of 1 CmA after the battery was charged to a depth of 150% with a current of 1 CmA before the 14 day-storage thereof in the thermostatic chamber kept at a temperature of 40° C.; and $C'_R$ represents a residual capacity as measured from the discharge capacity immediately after the 14 day-storage of battery in the thermostatic chamber kept at a temperature of 40° C.

Figure 8:
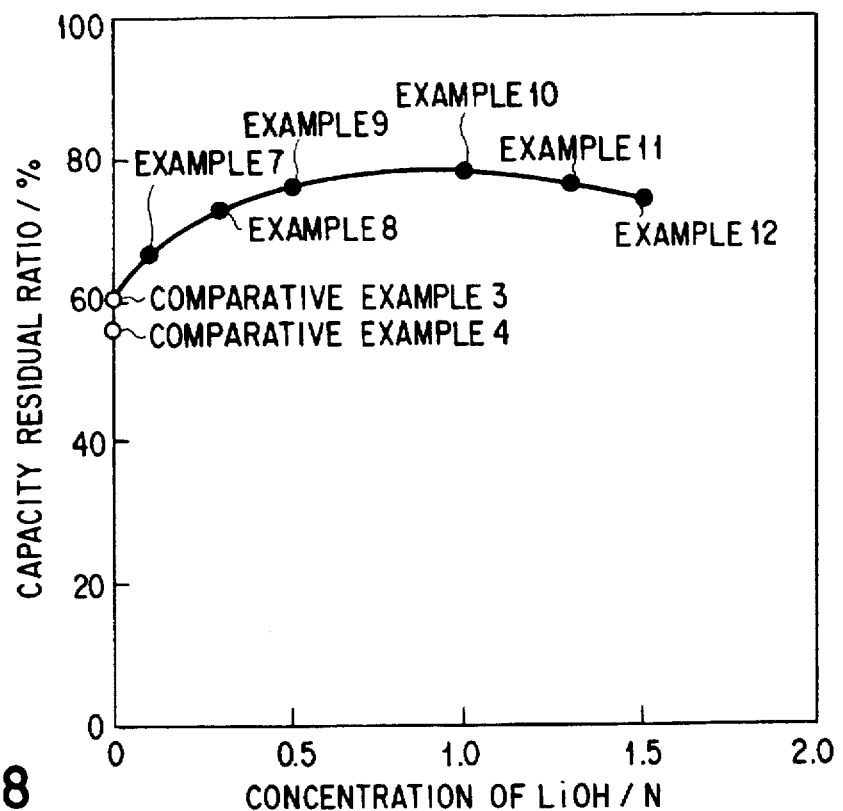
FIG. 8 is a graph showing the relationship between the residual capacity ratio of a nickel-hydrogen secondary battery in each of Examples 7 to 12 of the present invention as well as in each of Comparative Examples 3 and 4 and the concentration of lithium hydroxide in the electrolyte.
Figure 9:
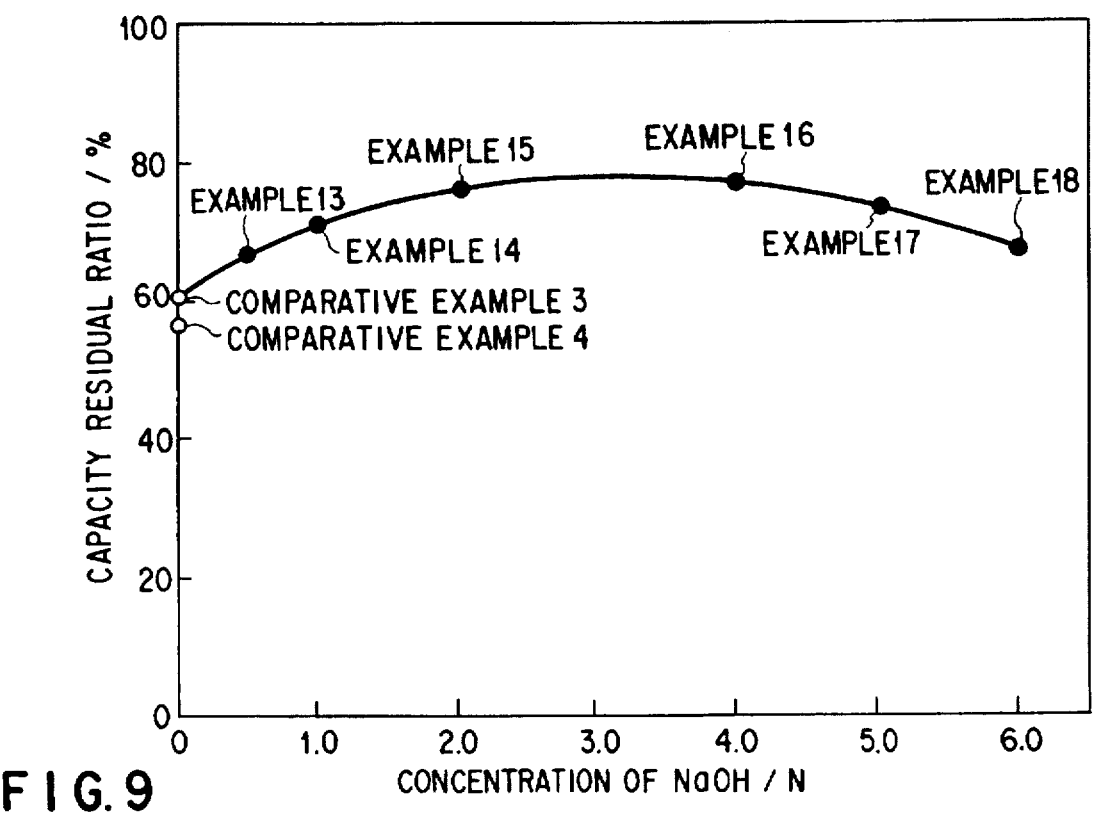
FIG. 9 is a graph showing the relationship between the residual capacity ratio of a nickel-hydrogen secondary battery in each of Examples 13 to 18 of the present invention as well as in each of Comparative Examples 3 and 4 and the concentration of sodium hydroxide in the electrolyte.

FIG. 8 illustrates the relationship between the concentration of lithium hydroxide in the electrolyte and the residual capacity ratio of a nickel-hydrogen secondary battery in each of Examples 7 to 12 and Comparative Examples 3 and 4. FIG. 9 illustrates the relationship between the concentration of sodium hydroxide in the electrolyte and the residual capacity ratio of a nickel-hydrogen secondary battery in each of Examples 13 to 18 of the present invention and Comparative Examples 3 and 4.

As seen from FIGS. 8 and 9, the secondary batteries according to Examples of 7 to 18 are superior than the secondary battery of Comparative Examples 3 and 4 in terms of self-discharging property under the condition of a high temperature storage of 40° C. It will be understood from these results that, for improving the self-discharge property of the battery during a high temperature storage, the employment of a separator satisfying the aforementioned equations (1) and (2), as well as the employment of an alkali electrolyte comprising at least either of lithium hydroxide or sodium hydroxide are very important.

(EXAMPLE 19)

A nonwoven fabric consisting of fiber 1 µm in average diameter X and having a weight per unit area of 50 g/m$^2$ and a thickness of 0.20 mm was prepared from polypropylene resin by the melt-blow method. Then, the nonwoven fabric thus prepared was dipped into an aqueous solution of acrylic acid and was then irradiated with ultra-violet rays thereby graft-polymerizing the acrylic acid monomer. The resultant nonwoven fabric was washed with water to remove unreacted acrylic acid and then dried to obtain a separator. The separator was formed of a sheet material consisting mainly of a polypropylene fibers having COOH group. The potassium ion exchange capacity of the separator was 0.1 meq/g. The measurement of the potassium ion exchange capacity was performed by the aforementioned titration process.

This separator was then disposed between the negative electrode and the positive electrode in the same manner as in Example 7, and the resultant composite was spirally wound to form an electrode group. This electrode group and an alkali electrolyte comprising 7N of KOH and 1N of LiOH were introduced into the bottomed cylindrical case to manufacture a cylindrical nickel-hydrogen secondary battery of AA size as shown in FIG. 1.

(EXAMPLE 20)

A nonwoven fabric consisting of fiber 1 µm in average diameter X and having a weight per unit area of 50 g/m$^2$ and a thickness of 0.20 mm was prepared from polypropylene resin by the melt-blow method. Then, the nonwoven fabric thus prepared was dipped into an aqueous solution of acrylic acid and was then irradiated with ultra-violet rays thereby graft-polymerizing the acrylic acid monomer. The resultant nonwoven fabric was washed with water to remove unreacted acrylic acid and then dried to obtain a separator. The separator was formed of a sheet material consisting mainly of a polypropylene fibers having COOH group. The potassium ion exchange capacity of the separator was 1.0 meq/g. Then, the same procedure was repeated in the same manner as explained in Example 19 except that the separator obtained in this example was employed in place of the separator of Example 19 to manufacture a cylindrical nickel-hydrogen secondary battery of similar type to that of Example 19.

(EXAMPLE 21)

A nonwoven fabric consisting of fiber 1 µm in average diameter X and having a weight per unit area of 50 g/m$^2$ and a thickness of 0.20 mm was prepared from polypropylene resin by the melt-blow method. Then, the nonwoven fabric thus prepared was dipped into an aqueous solution of acrylic acid and was then irradiated with ultra-violet rays thereby graft-polymerizing the acrylic acid monomer. The resultant nonwoven fabric was washed with water to remove unreacted acrylic acid and then dried to obtain a separator. The separator was formed of a sheet material consisting mainly of a polypropylene fibers having COOH group. The potassium ion exchange capacity of the separator was 2.0 meq/g. Then, the same procedure was repeated in the same manner as explained in Example 19 except that the separator obtained in this example was employed in place of the separator of Example 19 to manufacture a cylindrical nickel-hydrogen secondary battery of similar type to that of Example 19.

According to the aforementioned equation (1), if the average diameter X of the polypropylene fibers having the COOH group is set to 1 µm, the potassium ion exchange capacity Y meq/g falling in the range of $0.1 \leq Y \leq 2.0$ is required for obtaining an excellent self-discharge property during a high temperature storage and an excellent large current discharge property of the battery. Therefore, the separators obtained in this Examples 19 to 21 were confirmed, with regard to the average diameter X (µm) and the potassium ion exchange capacity Y (meq/g), to meet the aforementioned equations (1) and (2).

(EXAMPLE 22)

First of all, a copolymer fiber was prepared from a copolymer of polypropylene resin with butene. This copolymer fiber was mixed with polypropylene fiber at a mixing ratio of 50 to 50% by weight to prepare through a wet process a nonwoven fabric consisting of fibers 20 µm in average diameter X and having a weight per unit area of 50 g/m$^2$ and a thickness of 0.2 mm. Then, the nonwoven fabric thus prepared was dipped into an aqueous solution of acrylic acid and then irradiated with ultra-violet rays thereby graft-polymerizing the acrylic acid monomer. The resultant nonwoven fabric was washed with water to remove unreacted acrylic acid and then dried to obtain a separator. The separator was formed of a sheet material consisting mainly of a polypropylene fibers having COOH group and a copolymer fibers having COOH group. The potassium ion exchange capacity of the separator was 1.1 meq/g. The measurement of the potassium ion exchange capacity was performed by the aforementioned titration process.

Then, the same procedure was repeated in the same manner as explained in Example 19 except that the separator obtained in this example was employed in place of the separator of Example 19 to manufacture a cylindrical nickel-hydrogen secondary battery of similar type to that of Example 19.

(EXAMPLE 23)

First of all, a copolymer fiber was prepared from a copolymer of polypropylene resin with butene. This copolymer fiber was mixed with polypropylene fiber at a mixing ratio of 50 to 50% by weight to prepare through a wet process a nonwoven fabric consisting of fibers 20 µm in average diameter X and having a weight per unit area of 50 g/m$^2$ and a thickness of 0.2 mm. Then, the nonwoven fabric thus prepared was dipped into an aqueous solution of acrylic acid and then irradiated with ultra-violet rays thereby graft-polymerizing the acrylic acid monomer. The resultant nonwoven fabric was washed with water to remove unreacted acrylic acid and then dried to obtain a separator. The separator was formed of a sheet material consisting mainly of a polypropylene fibers having COOH group and a copolymer fibers having COOH group. The potassium ion exchange capacity of the separator was 1.5 meq/g. Then, the same procedure was repeated in the same manner as explained in Example 19 except that the separator obtained in this example was employed in place of the separator of Example 19 to manufacture a cylindrical nickel-hydrogen secondary battery of similar type to that of Example 19.

(EXAMPLE 24)

First of all. a copolymer fiber was prepared from a copolymer of polypropylene resin with butene. This copolymer fiber was mixed with polypropylene fiber at a mixing ratio of 50 to 50% by weight to prepare through a wet process a nonwoven fabric consisting of fibers 20 μm in average diameter X and having a weight per unit area of 50 g/m² and a thickness of 0.2 mm. Then. the nonwoven fabric thus prepared was dipped into an aqueous solution of acrylic acid and then irradiated with ultra-violet rays thereby graft-polymerizing the acrylic acid monomer. The resultant nonwoven fabric was washed with water to remove unreacted acrylic acid and then dried to obtain a separator. The separator was formed of a sheet material consisting mainly of a polypropylene fibers having COOH group and a copolymer fibers having COOH group. The potassium ion exchange capacity of the separator was 2.0 meq/g. Then, the same procedure was repeated in the same manner as explained in Example 19 except that the separator obtained in this example was employed in place of the separator of Example 19 to manufacture a cylindrical nickel-hydrogen secondary battery of similar type to that of Example 19.

According to the aforementioned equation (1), if the average diameter X of all fibers constituting the separator is set to 20 μm, the potassium ion exchange capacity Y meq/g falling in the range of $1.0 \leq Y \leq 2.0$ is required for obtaining an excellent self-discharge property during a high temperature storage and an excellent large current discharge property of the battery. Therefore, the separators obtained in this Examples 22 to 24 were confirmed, with regard to the average diameter X and the potassium ion exchange capacity Y, to meet the aforementioned equations (1) and (2).

(Comparative Example 5)

A nonwoven fabric consisting of fiber 1 μm in average diameter X and having a weight per unit area of 50 g/m² and a thickness of 0.2 mm was prepared from polypropylene resin by the melt-blow method Then, the nonwoven fabric thus prepared was dipped into an aqueous solution of acrylic acid and was then irradiated with ultra-violet rays thereby graft-polymerizing the acrylic acid monomer. The resultant nonwoven fabric was washed with water to remove unreacted acrylic acid and then dried to obtain a separator. The separator was formed of a sheet material consisting mainly of a polypropylene fibers having COOH group. The potassium ion exchange capacity of the separator was 0.05 meq/g. Then, the same procedure was repeated in the same manner as explained in Example 19 except that the separator obtained in this example was employed in place of the separator of Example 19 to manufacture a cylindrical nickel-hydrogen secondary battery of similar type to that of Example 19.

(Comparative Example 6)

A nonwoven fabric consisting of fiber 1 μm in average diameter X and having a weight per unit area of 50 g/m² was prepared from polypropylene resin by the melt-blow method. Then, the nonwoven fabric thus prepared was dipped into an aqueous solution of acrylic acid and was then irradiated with ultra-violet rays thereby graft-polymerizing the acrylic acid monomer. The resultant nonwoven fabric was washed with water to remove unreacted acrylic acid and then dried to obtain a separator. The separator was formed of a sheet material consisting mainly of a polypropylene fibers having COOH group. The potassium ion exchange capacity of the separator was 2.5 meq/g. Then, the same procedure was repeated in the same manner as explained in Example 19 except that the separator obtained in this example was employed in place of the separator of Example 19 to manufacture a cylindrical nickel-hydrogen secondary battery of similar type to that of Example 19.

(Comparative Example 7)

First of all. a copolymer fiber was prepared from a copolymer of polypropylene resin with butene. This copolymer fiber was mixed with polypropylene fiber at a mixing ratio of 50 to 50% by weight to prepare through a wet process a nonwoven fabric consisting of fibers 20 μm in average diameter X and having a weight per unit area of 50 g/m² and a thickness of 0.2 mm. Then, the nonwoven fabric thus prepared was dipped into an aqueous solution of acrylic acid and then irradiated with ultra-violet rays thereby graft-polymerizing the acrylic acid monomer. The resultant nonwoven fabric was washed with water to remove unreacted acrylic acid and then dried to obtain a separator. The separator was formed of a sheet material consisting mainly of a polypropylene fibers having COOH group and a copolymer fibers having COOH group. The potassium ion exchange capacity of the separator was 0.6 meq/g. Then, the same procedure was repeated in the same manner as explained in Example 19 except that the separator obtained in this example was employed in place of the separator of Example 19 to manufacture a cylindrical nickel-hydrogen secondary battery of similar type to that of Example 19.

(Comparative Example 8)

First of all, a copolymer fiber was prepared from a copolymer of polypropylene resin with butene. This copolymer fiber was mixed with polypropylene fiber at a mixing ratio of 50 to 50% by weight to prepare through a wet process a nonwoven fabric consisting mainly of fibers 20 μm in average diameter X and having a weight per unit area of 50 g/m² and a thickness of 0.2 mm. Then, the nonwoven fabric thus prepared was dipped into an aqueous solution of acrylic acid and then irradiated with ultra-violet rays thereby graft-polymerizing the acrylic acid monomer. The resultant nonwoven fabric was washed with water to remove unreacted acrylic acid and then dried to obtain a separator. The separator was formed of a sheet material consisting of a polypropylene fibers having COOH group and a copolymer fibers having COOH group. The potassium ion exchange capacity of the separator was 2.5 meq/g. Then, the same procedure was repeated in the same manner as explained in Example 19 except that the separator obtained in this example was employed in place of the separator of Example 19 to manufacture a cylindrical nickel-hydrogen secondary battery of similar type to that of Example 19.

(Comparative Example 9)

A nonwoven fabric consisting of fiber 0.5 μm in average diameter X and having a weight per unit area of 50 g/m² was prepared from polypropylene resin by the melt-blow method Then, the nonwoven fabric thus prepared was dipped into an aqueous solution of acrylic acid and was then irradiated with ultra-violet rays thereby graft-polymerizing the acrylic acid monomer. The resultant nonwoven fabric was washed with water to remove unreacted acrylic acid and then dried to obtain a separator. The separator was formed of a sheet material consisting mainly of a polypropylene fibers having COOH group. The potassium ion exchange capacity of the separator was 1.0 meq/g. When this separator was tried to be spirally wound to form an electrode group, the separator was broken due to the poor mechanical strength thereof so that a secondary battery could not be manufactured.

(Comparative Example 10)

First of all, a copolymer fiber was prepared from a copolymer of polypropylene resin with butene. This copolymer fiber was mixed with polypropylene fiber at a mixing ratio of 50 to 50% by weight to prepare through a wet process a nonwoven fabric consisting of fibers 25 μm in average diameter X and having a weight per unit area of 50 g/m² and a thickness of 0.2 mm. Then, the nonwoven fabric thus prepared was dipped into an aqueous solution of acrylic acid and then irradiated with ultra-violet rays thereby graft-polymerizing the acrylic acid monomer. The resultant nonwoven fabric was washed with water to remove unreacted acrylic acid and then dried to obtain a separator. The separator was formed of a sheet material consisting mainly of a polypropylene fibers having COOH group and a copolymer fibers having COOH group. The potassium ion exchange capacity of the separator was 1.0 meq/g. Then, the same procedure was repeated in the same manner as explained in Example 19 except that the separator obtained in this example was employed in place of the separator of Example 19 to manufacture a cylindrical nickel-hydrogen secondary battery of similar type to that of Example 19.

Figure 10:
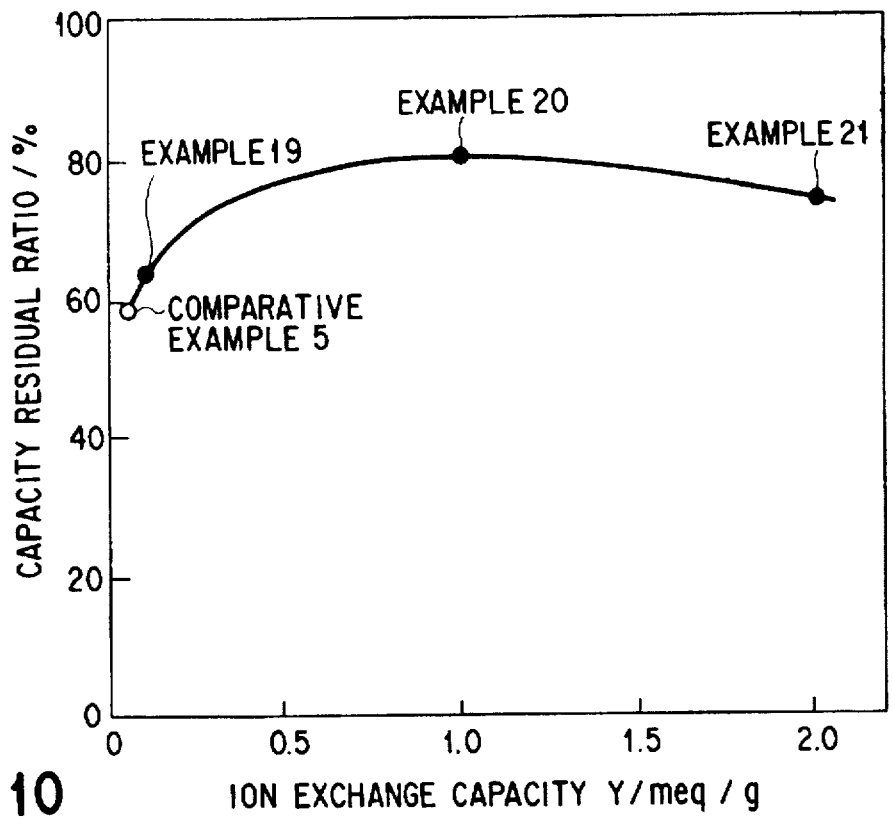
FIG. 10 is a graph showing the relationship between the residual capacity ratio of a nickel-hydrogen secondary battery in each of Examples 19 to 21 of the present invention as well as in Comparative Example 5 and the ion-exchange capacity of separator.
Figure 11:
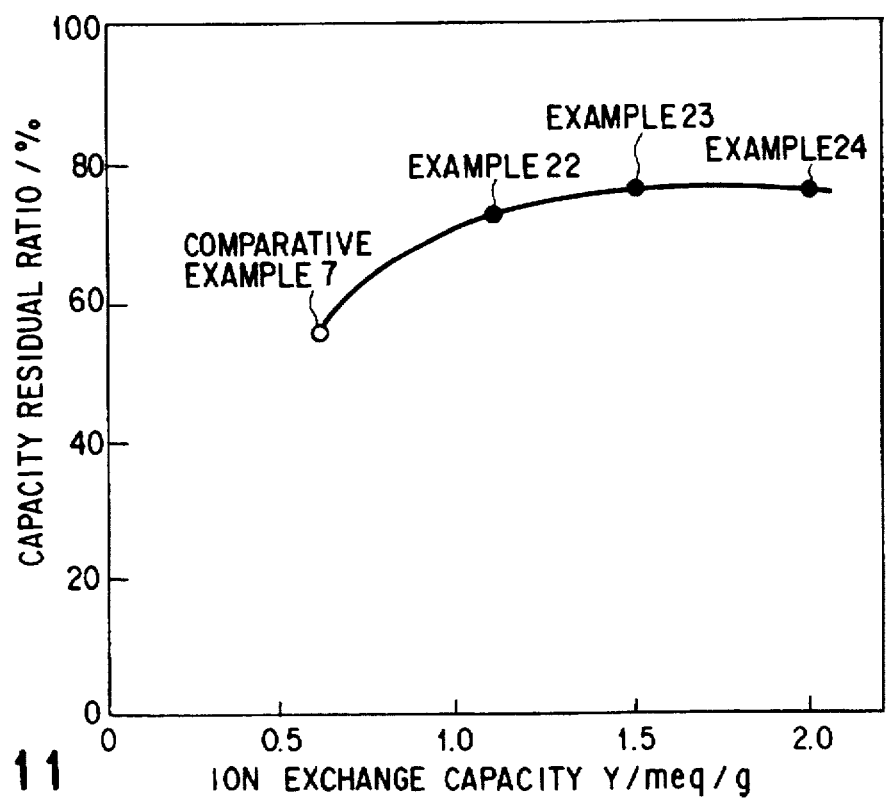
FIG. 11 is a graph showing the relationship between the residual capacity ratio of a nickel-hydrogen secondary battery in each of Examples 22 to 24 of the present invention as well as in Comparative Example 7 and the ion-exchange capacity of separator.

These secondary batteries obtained in Examples 19 to 24 and Comparative Examples 5 and 7 were measured, in the same manner as in the case of the secondary batteries of Examples 7 to 18, with respect to the self-discharging property under the condition of a high temperature storage of 40° C., the results being as shown in FIGS. 10 and 11.

As apparent from FIG. 10, the secondary batteries obtained in Examples 19 to 21 indicated an improved self-discharging property under the condition of a high temperature storage as compared with that of Comparative Example 5. Further, as apparent from FIG. 11, the secondary batteries obtained in Examples 22 to 24 indicated an improved self-discharging property under the condition of a high temperature storage as compared with that of Comparative Example 7.

These secondary batteries obtained in Examples 19 to 24 and Comparative Example 10 were measured with respect to the ratio of defective insulation after the manufacture of the electrode group. The measurement of defective insulation after the manufacture of the electrode group was performed by measuring the insulation resistance indicated by 100 samples of each electrode group when a voltage of 500V was impressed onto these samples by using an insulation resistance tester immediately after the manufacture of these samples. The results are shown in Table 2.

TABLE 2

|  | Average diameter "X" (μm) | 0.5X + 0.05 (meq/g) | Ion exchange capacity "Y" (meg/q) | Ratio of defective insulation (%) |
|---|---|---|---|---|
| Example 19 | 1 | 0.1 | 0.1 | 0 |
| Example 20 | 1 | 0.1 | 1.0 | 0 |
| Example 21 | 1 | 0.1 | 2.0 | 0 |
| Example 22 | 20 | 1.05 | 1.1 | 0 |
| Example 23 | 20 | 1.05 | 1.5 | 0 |
| Example 24 | 20 | 1.05 | 2.0 | 0 |
| Comparative Example 10 | 25 | 1.3 | 1.0 | 8 |

As apparent from Table 2, the secondary batteries according to Examples 19 to 24 were capable of avoiding the generation of insulation defective at the time of manufacture of the electrode group. This can be described to the fact that the short circuit between the positive electrode and the negative electrode in the winding of electrode group can be effectively prevented due to an increased density of the separators employed in Examples 19 to 24.

Next, the secondary batteries obtained in Examples 19 to 24 and Comparative Examples 6 and 8 were measured with respect to the discharge capacity thereof wherein each battery was charged to a depth of 150% with an electric current of 0.3 CmA and then discharged with a cut of 2 CmA/1.0 V thereby evaluating the large current discharge properties of the secondary batteries. The discharge capacity of each battery was calculated by measuring the time required for the battery to go down in voltage to 1.0 V due to a discharge of 2 CmA.

The results of the test regarding the large current discharge properties of the secondary batteries are shown in Tables 3 and 4. In Table 3, the discharge capacity of Examples 20, 21 and Comparative Examples 6, 8 are shown with the discharge capacity of Example 19 defined as being 100. On the other hand, in Table 4, the discharge capacity of Examples 22 to 24 and Comparative Examples 6, 8 are shown with the discharge capacity of Example 22 defined as being 100.

TABLE 3

|  | Average diameter "X" (μm) | 0.5X + 0.05 (meq/g) | Ion exchange capacity "Y" (meg/q) | Discharge capacity |
|---|---|---|---|---|
| Example 19 | 1 | 0.1 | 0.1 | 100 |
| Example 20 | 1 | 0.1 | 1.0 | 99 |
| Example 21 | 1 | 0.1 | 2.0 | 97 |
| Comparative Example 6 | 1 | 0.1 | 2.5 | 87 |
| Comparative Example 8 | 20 | 1.05 | 2.5 | 90 |

TABLE 4

|  | Average diameter "X" (μm) | 0.5X + 0.05 (meq/g) | Ion exchange capacity "Y" (meg/q) | Discharge capacity |
|---|---|---|---|---|
| Example 22 | 20 | 1.05 | 1.1 | 100 |
| Example 23 | 20 | 1.05 | 1.5 | 98 |
| Example 24 | 20 | 1.05 | 2.0 | 97 |
| Comparative Example 6 | 1 | 0.1 | 2.5 | 87 |
| Comparative Example 8 | 20 | 1.05 | 2.5 | 90 |

As apparent from Table 3, the secondary batteries according to Examples 19 to 21 were superior in large current discharge property as compared with those of Comparative Examples 6 and 8. Further, as apparent from Table 4, the secondary batteries according to Examples 22 to 24 were also superior in large current discharge property as compared with those of Comparative Examples 6 and 8.

This can be ascribed to the fact that the ion exchange capacity of the separators employed in the secondary batteries of the Comparative Examples 6 and 8 were so large that the alkali metal ions in the electrolyte were fixed to the separator, whereby lowering the voltage during a large current discharge.

(EXAMPLE 25)

A nonwoven fabric consisting of long fiber 10 μm in average diameter and having a weight per unit area of 50 g/m² and a thickness of 0.20 mm was prepared by processing polypropylene resin according to a spun bond method. Then, by making use of an apparatus comprising a pair of parallel rolls, each being adapted to be rotated in the opposite direction to each other, i.e. a first roll having a smooth surface and a second roll having a plurality of pinpoint-shaped projections, and heated to 130° C., the nonwoven fabric was forced to pass through the space between these rolls to be pressed and thermally fused, thereby forming an emboss pattern. As a result, a plurality of circular depressions were formed on a first surface of the nonwoven fabric, and at the same time a plurality of film-like portions (film portion) were formed on the bottom of the circular depressions (embossed surface). Concurrently, the portions of a second surface which correspond to the embossed surface were turned into a film. The areal ratio of the film portion was limited to 16% based on the whole area of the second surface of the nonwoven fabric. Thereafter, the nonwoven fabric was dipped into an aqueous solution of acrylic acid, and then exposed to the irradiation of ultra-violet rays thereby graft-polymerizing the acrylic acid monomer. The resultant nonwoven fabric was washed to remove unreacted acrylic acid, and then dried thereby obtaining a separator.

The separator was formed of a sheet material consisting mainly of a polypropylene fibers having COOH group and a polypropylene fibers having no COOH group. The embossed first surface of the separator was found as being entirely made hydrophilic, and the whole area excepting the film portion of the second surface was found also as being made hydrophilic with the film portion of the second surface being remained hydrophobic (areal ratio:16%). Then, the graft-copolymerization ratio of the acrylic acid monomer of the hydrophilic portion of the separator was measured by a titration method. As a result, the potassium ion exchange capacity was found 0.8 meq/g.

According to the aforementioned equation (1), if the average diameter of all fibers constituting the separator is set to 10 μm, the potassium ion exchange capacity Y meq/g falls in the range of $0.55 \leq Y \leq 2.0$. Therefore, the separator obtained in this Example was confirmed to meet the aforementioned equations (1) and (2).

This separator was then disposed, as in the case of Example 7, between the negative electrode and the positive electrode in such a manner that the second surface having a hydrophilic portion and a hydrophobic portion of the separator faced the negative electrode, and the resultant composite was spirally wound to form an electrode group. This electrode group and an alkali electrolyte comprising 0.1N of LiOH and 7.9N of KOH were introduced into the bottomed cylindrical case to manufacture a cylindrical nickel-hydrogen secondary battery of AA size as shown in FIG. 1.

(EXAMPLE 26)

The same procedure as explained in Example 25 was repeated except that a different alkali electrolyte comprising 0.3N of LiOH and 7.7N of KOH was employed in this Example, thereby obtaining a nickel-hydrogen secondary battery of the same type as that of Example 25.

(EXAMPLE 27)

The same procedure as explained in Example 25 was repeated except that a different alkali electrolyte comprising 0.5N of LiOH and 7.5N of KOH was employed in this Example, thereby obtaining a nickel-hydrogen secondary battery of the same type as that of Example 25.

(EXAMPLE 28)

The same procedure as explained in Example 25 was repeated except that a different alkali electrolyte comprising 1.0N of LiOH and 7.0N of KOH was employed in this Example, thereby obtaining a nickel-hydrogen secondary battery of the same type as that of Example 25.

(EXAMPLE 29)

The same procedure as explained in Example 25 was repeated except that a different alkali electrolyte comprising 1.3N of LiOH and 6.7N of KOH was employed in this Example, thereby obtaining a nickel-hydrogen secondary battery of the same type as that of Example 25.

(EXAMPLE 30)

The same procedure as explained in Example 25 was repeated except that a different alkali electrolyte comprising 1.5N of LiOH and 6.5N of KOH was employed in this Example, thereby obtaining a nickel-hydrogen secondary battery of the same type as that of Example 25.

(EXAMPLE 31)

The same procedure as explained in Example 25 was repeated except that a different alkali electrolyte comprising 0.5N of NaOH and 7.5N of KOH was employed in this Example, thereby obtaining a nickel-hydrogen secondary battery of the same type as that of Example 25.

(EXAMPLE 32)

The same procedure as explained in Example 25 was repeated except that a different alkali electrolyte comprising 1.0N of NaOH and 7.0N of KOH was employed in this Example, thereby obtaining a nickel-hydrogen secondary battery of the same type as that of Example 25.

(EXAMPLE 33)

The same procedure as explained in Example 25 was repeated except that a different alkali electrolyte comprising 2.0N of NaOH and 6.0N of KOH was employed in this Example, thereby obtaining a nickel-hydrogen secondary battery of the same type as that of Example 25.

(EXAMPLE 34)

The same procedure as explained in Example 25 was repeated except that a different alkali electrolyte comprising 4.0N of NaOH and 4.0N of KOH was employed in this Example, thereby obtaining a nickel-hydrogen secondary battery of the same type as that of Example 25.

(EXAMPLE 35)

The same procedure as explained in Example 25 was repeated except that a different alkali electrolyte comprising 5.0N of NaOH and 3.0N of KOH was employed in this Example, thereby obtaining a nickel-hydrogen secondary battery of the same type as that of Example 25.

(EXAMPLE 36)

The same procedure as explained in Example 25 was repeated except that a different alkali electrolyte comprising 6.0N of NaOH and 2.0N of KOH was employed in this Example, thereby obtaining a nickel-hydrogen secondary battery of the same type as that of Example 25.

(Comparative Example 11)

The same procedure as explained in Example 25 was repeated except that a different alkali electrolyte comprising 8.0N of KOH was employed in this Comparative Example, thereby obtaining a nickel-hydrogen secondary battery of the same type as that of Example 25.

Figure 12:
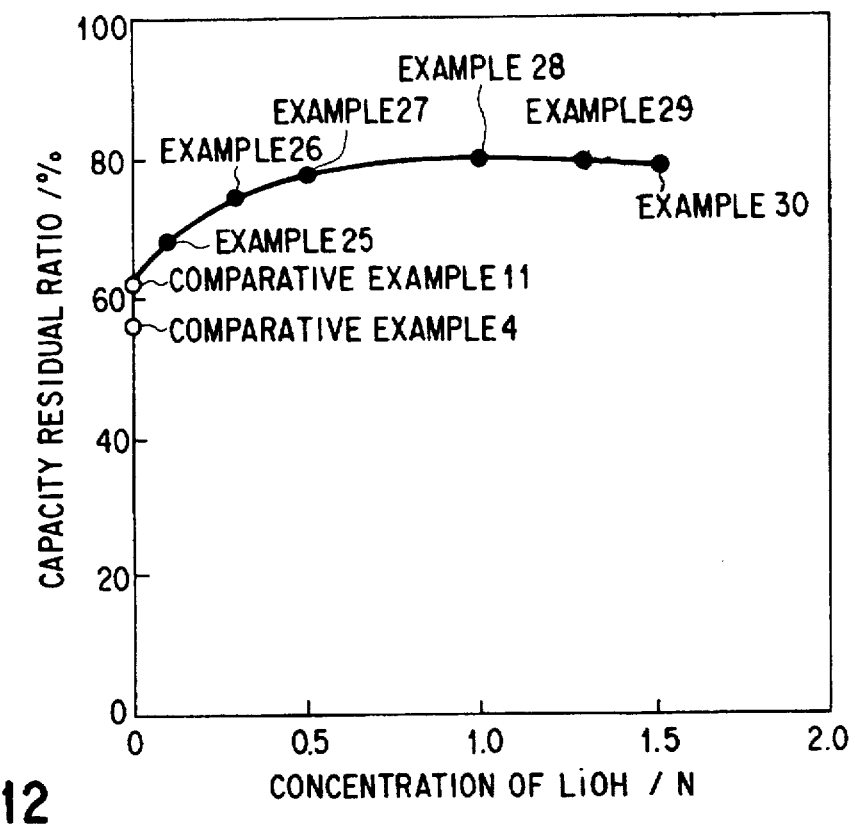
FIG. 12 is a graph showing the relationship between the residual capacity ratio of a nickel-hydrogen secondary battery in each of Examples 25 to 30 of the present invention as well as in each of Comparative Examples 11 and 4 and the concentration of lithium hydroxide in the electrolyte.
Figure 13:
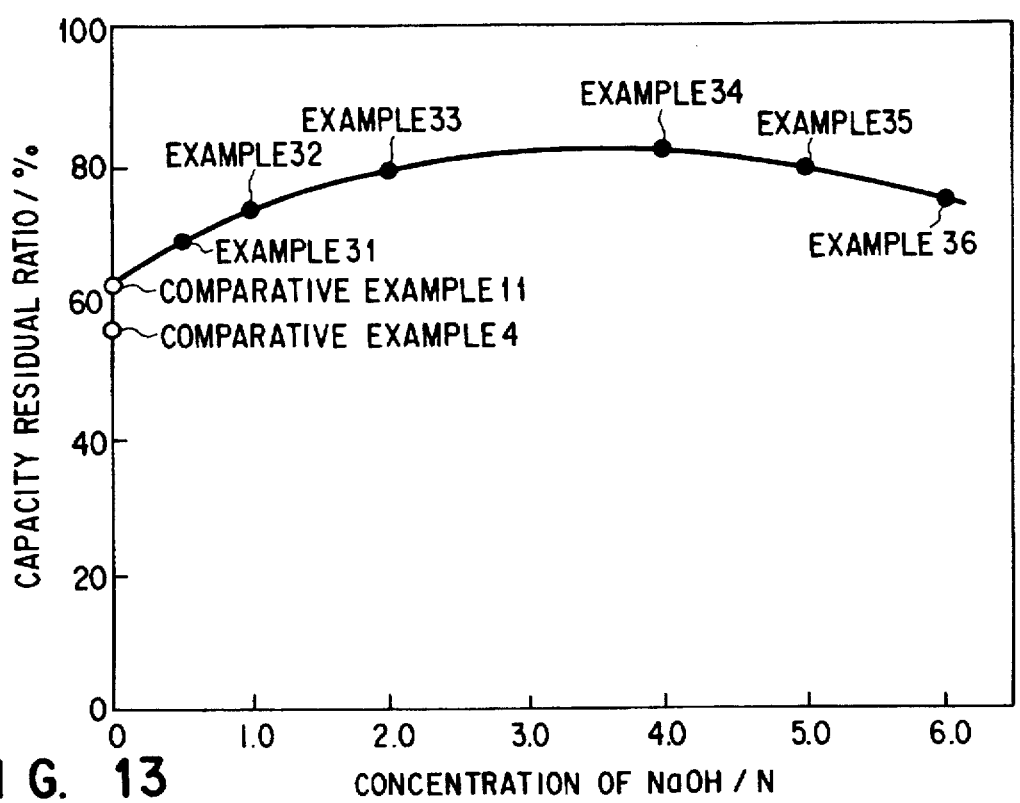
FIG. 13 is a graph showing the relationship between the residual capacity ratio of a nickel-hydrogen secondary battery in each of Examples 31 to 36 of the present invention as well as in each of Comparative Examples 11 and 4 and the concentration of sodium hydroxide in the electrolyte.

These secondary batteries obtained in Examples 25 to 36 and Comparative Examples 11 and 4 were measured, in the same manner as in the case of the secondary batteries of Examples 7 to 18, with respect to the self-discharging property under the condition of a high temperature storage of 40° C., the results being as shown in FIGS. 12 and 13.

FIG. 12 illustrates the relationship between the residual capacity ratio of the secondary battery in each of Examples 25 to 30 as well as in each of Comparative Examples 11 and 4 and the concentration of lithium hydroxide in the electrolyte. FIG. 13 illustrates the relationship between the residual capacity ratio of the secondary battery in each of Examples 31 to 36 as well as in each of Comparative Examples 11 and 4 and the concentration of sodium hydroxide in the electrolyte.

As seen from FIG. 12, the secondary batteries according to Examples of 25 to 30 are superior than the secondary battery of Comparative Examples 11 and 4 in terms of self-discharging property under the condition of a high temperature storage of 40° C. As seen from FIG. 13, the secondary batteries according to Examples of 31 to 36 are superior than the secondary battery of Comparative Examples 11 and 4 in terms of self-discharging property under the condition of a high temperature storage of 40° C. It will be understood from the comparisons between FIG. 8 and FIG. 12 as well as between FIG. 9 and FIG. 13, a nickel-hydrogen secondary battery provided with a separator comprising a sheet material meeting the aforementioned equations (1) and (2), and having a first surface exhibiting hydrophilic nature and a second surface exhibiting both hydrophobic and hydrophilic natures, the separator being disposed between a positive electrode and a negative electrode such that the aforementioned second surface faces the negative electrode, is more advantageous in terms of improving the self-discharge property of the battery during a high temperature storage as compared with a nickel-hydrogen secondary battery provided with a separator satisfying the aforementioned equations (1) and (2).

Figure 6:
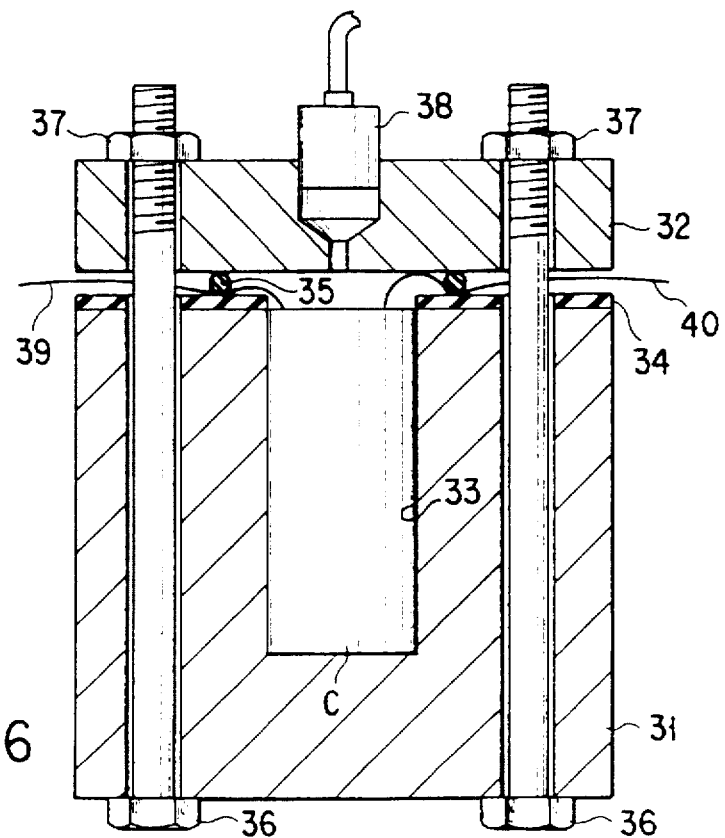
FIG. 6 is a sectional view of an apparatus for measuring an inner pressure of a nickel-hydrogen secondary battery in Examples 1 to 6 of the present invention and Comparative Example 1.

By making use of the inner battery pressure-measuring apparatus shown in FIG. 6, the measurement of the maximum inner battery pressure of the secondary batteries obtained in Examples 25 to 36 and Comparative Examples 3 and 4 was performed by charging the battery up to the depth of 480% with a current of 0.5 CmA. The results are shown in the following Tables 5 and 6.

TABLE 5

|  | Maximum Inner Battery pressure |
|---|---|
| Example 25 | 4.0 kg/cm² |
| Example 26 | 4.4 kg/cm² |
| Example 27 | 4.7 kg/cm² |
| Example 28 | 4.8 kg/cm² |
| Example 29 | 4.9 kg/cm² |
| Example 30 | 5.3 kg/cm² |
| Comparative Example 3 | 13.7 kg/cm² |
| Comparative Example 4 | 13.0 kg/cm² |

TABLE 6

|  | Maximum Inner Battery pressure |
|---|---|
| Example 31 | 4.3 kg/cm² |
| Example 32 | 4.5 kg/cm² |
| Example 33 | 4.9 kg/cm² |
| Example 34 | 5.1 kg/cm² |
| Example 35 | 5.3 kg/cm² |
| Example 36 | 5.4 kg/cm² |
| Comparative Example 3 | 13.7 kg/cm² |
| Comparative Example 4 | 13.0 kg/cm² |

As seen from the Table 5, the secondary batteries according to Examples of 25 to 30 exhibited a lower inner pressure at the occasion of over-charging as compared with the secondary battery of Comparative Examples 3 and 4. Also as seen from the Table 6, the secondary batteries according to Examples of 31 to 36 exhibited a lower inner pressure at the occasion of over-charging as compared with the secondary battery of Comparative Examples 3 and 4.

It can be seen from these results that the secondary batteries according to Examples of 25 to 30 were more effective as compared with the secondary batteries according to Examples of 7 to 18 not only in improving the self-discharge properties during a high temperature storage, but also in inhibiting an increase in inner pressure at the occasion of over-charging.

These effects can be attributed to the fact that the ion exchange capacity of the top surface of the separator was made differentiated from that of the back surface thereof, i.e., the separator was constructed in such a manner that the first surface thereof was made hydrophilic, while the second surface thereof was made partially hydrophilic and partially hydrophobic, and at the same time the separator was disposed between a positive electrode and a negative electrode with the second surface being disposed to face the negative electrode.

(EXAMPLE 37)

A nonwoven fabric sheet (a core layer) consisting of polypropylene fiber 3 μm in average diameter and having a weight per unit area of 18 g/m² was prepared by the melt-blow method. On the other hand, a couple of nonwoven fabric sheets (a surface layer) each consisting of a composite fiber having a core-sheath structure wherein a core polypropylene fiber covered by a polyethylene resin sheath and a mean diameter of 15 μm, a weight per unit area thereof being 18 g/m², were prepared. Then, the nonwoven fabric consisting of polypropylene monofilament (a core layer) was sandwiched by a couple of the composite nonwoven fabric (surface layers), and the resultant stacked composite was fusion-bonded to obtain a 3-ply nonwoven fabric sheet. The resultant 3-ply nonwoven fabric sheet had an average diameter of 11 μm, a weight per unit area of 54 g/m² and a thickness of 0.15 mm. After being dipped into an aqueous acrylic acid solution, the 3-ply nonwoven fabric sheet was irradiated with ultra-violet rays thereby graft-polymerizing the acrylic acid monomer. The 3-ply nonwoven fabric sheet was then washed with water to remove unreacted acrylic acid and dried to obtain a separator.

The separator was formed of a 3-ply sheet consisting a core layer and a couple of surface layers disposed on both surfaces the core layer. The core layer consists mainly of a polypropylene fibers having COOH group. Each of the surface layers consists mainly of a composite fibers having COOH group wherein a core polypropylene fiber covered by a polyethylene resin sheath having COOH group. The average diameter of the fibers of the surface layers is large than the average diameter of the fibers of the core layer. The potassium ion exchange capacity of the separator was 0.8 meq/g.

This separator was then disposed, as in the case of Example 7, between the positive electrode and the negative electrode, and the resultant composite was spirally wound to form an electrode group. This electrode group and an alkali electrolyte comprising 1N of LiOH and 7N of KOH were introduced into the bottomed cylindrical case to manufacture a cylindrical nickel-hydrogen secondary battery of AA size as shown in FIG. 1.

According to the aforementioned equation (1), $(0.05X+0.05) \leq Y \leq 2.0$, if the average diameter X of all fibers constituting the separator is set to 11 µm, the potassium ion exchange capacity Y meq/g falling in the range of $0.6 \leq Y \leq 2.0$ is required for obtaining an excellent high temperature storage property and an excellent large current discharge property of the battery. Therefore, the separator obtained in this Example was confirmed to meet both of the aforementioned equations (1) and (2), i.e. $1 \leq X \leq 20$.

Figure 14:
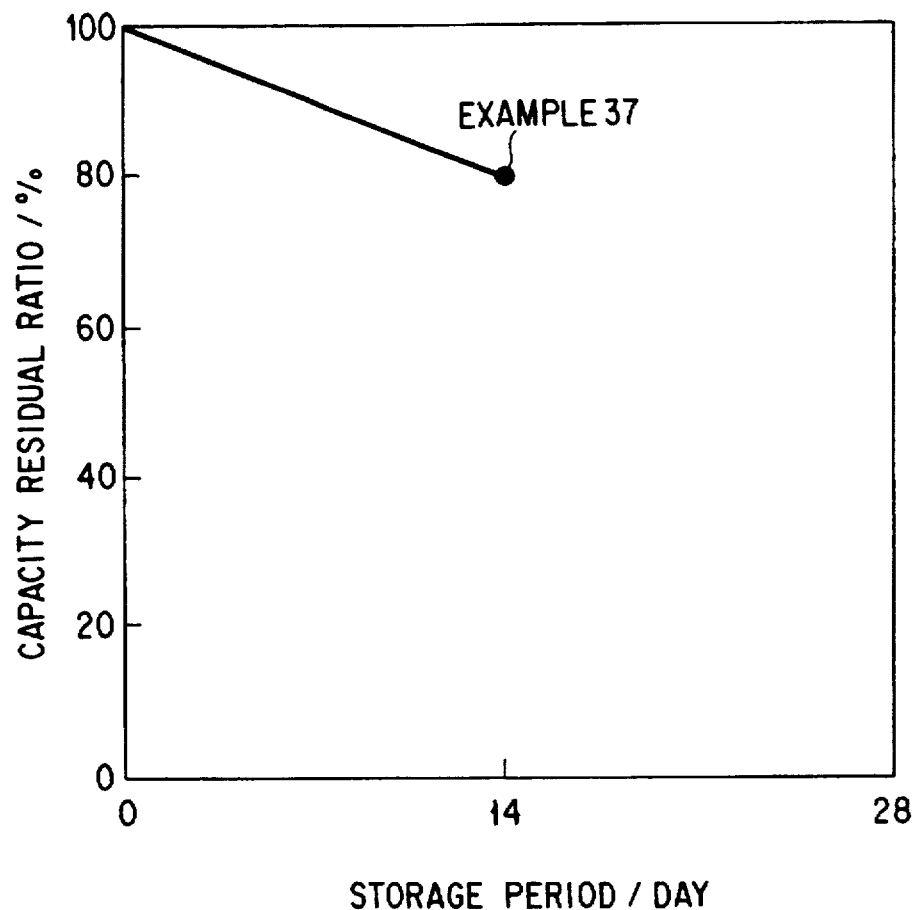
FIG. 14 is a graph showing the relationship between the storage days at a high temperature and the residual capacity ratio of a nickel-hydrogen secondary battery in Example 37 of the present invention.

The secondary battery obtained in Example 37 was measured, in the same manner as in the case of the secondary batteries of Examples 7 to 18, with respect to the self-discharging property under the condition of a high temperature storage of 40° C., the results being shown in FIG. 14.

As explained above, it is possible according to the present invention is to provide a nickel-hydrogen secondary battery and a method of manufacturing the nickel-hydrogen secondary battery wherein a long life of the battery is assured, and at the same time, an improved self-discharging property in a high temperature storage and the inhibition of increase in inner pressure of the battery in the occasion of overcharging can be realized.

It is also possible according to the present invention is to provide a nickel-hydrogen secondary battery which is improved in self-discharging property at the occasion of a high temperature storage, excellent in large current discharge properties, and capable of achieving a long life of the battery.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A nickel-hydrogen secondary battery comprising:
   a case,
   a paste-type positive electrode accommodated in said case and containing nickel hydroxide and a polymeric binder,
   a paste-type negative electrode accommodated in said case and containing a hydrogen-absorbing alloy and a polymeric binder,
   a separator accommodated in said case in such as manner as to be interposed between said positive and negative electrodes, and
   an alkali electrolyte accommodated in said case;
   wherein said separator is formed of a sheet material containing polyolefin-based synthetic resin fibers and has first and second surfaces opposite to each other, said first surface having a hydrophilic portion and a hydrophobic portion having an area ratio of 10% or less including 0% based on the area of said first surface, said second surface having a hydrophilic portion and a hydrophobic portion having an area ratio of 2 to 25% based on the area of said second surface, and the area ratio of said hydrophobic portion on said second surface being higher than that on said first surface; and
   said separator is interposed between said positive and negative electrodes such that said second surface of the separator faces said negative electrode.

2. The secondary battery according to claim 1, wherein said hydrogen-absorbing alloy is represented by a formula of $LmNi_xMn_yA_z$, wherein Lm represents lanthanum-rich misch metal, A represents at least one element selected from Al and Co, x, y and z are number which meets an equation of $4.8 < x+y+z < 5.4$.

3. The secondary battery according to claim 1, wherein said polyolefin-based synthetic resin fibers are polyethylene fibers and/or polypropylene fibers.

4. The secondary battery according to claim 1, wherein said polyolefin-based synthetic resin fibers are core-sheath composite fibers comprising a core made of a first polyolefin and a sheath made of a second polyolefin.

5. The secondary battery according to claim 1, wherein said hydrophilic portion of the separator is constituted by a graft-copolymerization of vinyl monomer having a hydrophilic group.

6. The secondary battery according to claim 5, wherein a graft-copolymerization ratio of said vinyl monomer constituting said hydrophilic portion of the separator is 0.2 to 2.0 meq/g as measured by means of potassium ion exchange capacity to be determined by a titration.

7. The secondary battery according to claim 5, wherein said vinyl monomer having a hydrophilic group is acrylic acid monomer.

8. The secondary battery according to claim 1, wherein an area ratio of hydrophobic portion of said second surface is 8 to 20% of the total area of said second surface.

9. The secondary battery according to claim 1, wherein said separator comprises a nonwoven fabric formed of polypropylene fibers having an average diameter of 10 µm, to which acrylic acid monomer is graft-copolymerized, said first surface of separator being entirely graft-copolymerized with acrylic monomer, said second surface of separator being partially graft-polymerized with acrylic monomer, and a graft-copolymerization ratio of acrylic monomer on said separator being 0.8 meq/g as expressed by potassium ion exchange capacity as determined by a titration process.

10. The secondary battery according to claim 1, wherein said separator comprises a nonwoven fabric formed of polypropylene fibers having an average diameter of 1 µm, to which acrylic acid monomer is graft-copolymerized, said first surface of separator being entirely graft-copolymerized with acrylic monomer, said second surface of separator being partially graft-polymerized with acrylic monomer, and a graft-copolymerization ratio of acrylic monomer on said separator being 0.8 meq/g as expressed by potassium ion exchange capacity as determined by a titration process.

11. The secondary battery according to claim 1, wherein said separator has a plurality of depressed portions formed on said first surface and film portions formed on those portions of said second surface which correspond to the depressed portions on said first surface, the hydrophobic portions on said second surface consisting of said film portions, and the hydrophilic portions on said first and second surfaces being formed by graft copolymerization of vinyl monomers having hydrophilic groups.

12. A nickel-hydrogen secondary battery comprising;
a positive electrode containing nickel hydroxide;
a negative electrode containing a hydrogen-absorbing alloy;
a separator interposed between said positive electrode and said negative electrode, and
an alkali electrolyte;
wherein said separator is formed of a sheet material which comprises fibers including polyolefin-based synthetic resin fibers having an ion-exchange group and satisfies the following equations (1) and (2):

$$(0.05X+0.05) \leq Y \leq 2.0 \quad (1);$$

$$1 \leq X \leq 20 \quad (2);$$

wherein Y in the equation (1) represents potassium ion-exchange capacity (meq/g) and X in the equations (1) and (2) represents an average diameter (μm) of said fibers; and
said electrolyte comprises at least either lithium hydroxide or sodium hydroxide.

13. A nickel-hydrogen secondary battery according to claim 12, wherein said potassium ion exchange capacity Y (meq/g) meets the following equation (3):

$$(0.05X+0.15) \leq Y \leq 1.2 \quad (3).$$

14. A nickel-hydrogen secondary battery according to claim 12, wherein said average diameter X (μm) of said fibers meets the following equation (4):

$$3 \leq X \leq 15 \quad (4).$$

15. A nickel-hydrogen secondary battery according to claim 12, wherein said fibers includes polyolefin-based synthetic resin fibers having an ion-exchange group and polyolefin-based synthetic resin fibers having no ion-exchange group.

16. A nickel-hydrogen secondary battery according to claim 12, wherein said polyolefin-based synthetic resin fibers having an ion-exchange group are polyethylene fibers having an ion-exchange group and/or polypropylene fibers having an ion-exchange group.

17. A nickel-hydrogen secondary battery according to claim 12, wherein said polyolefin-based synthetic resin fibers having an ion-exchange group are core-sheath composite fibers comprising a core made of a first polyolefin and a sheath made of a second polyolefin.

18. A nickel-hydrogen secondary battery according to claim 12, wherein said ion-exchange group is COOH group.

19. A nickel-hydrogen secondary battery according to claim 12, wherein said ion exchange group of the polyolefin-based synthetic resin fibers is formed by a graft-copolymerization of vinyl monomer having an ion exchange capacity.

20. A nickel-hydrogen secondary battery according to claim 19, wherein said vinyl monomer is acrylic acid monomer.

21. A nickel-hydrogen secondary battery according to claim 12, wherein said sheet material comprises a core layer and two surface layers disposed on both surfaces said core layer, wherein said core layer consists mainly of fibers including polyolefin-based synthetic resin fibers having an ion-exchange group, each of said surface layers consists mainly of fibers including polyolefin-based synthetic resin fibers having an ion-exchange group, and an average diameter of said fibers of said surface layers is larger than the average diameter of said fibers of said core layer.

22. A nickel-hydrogen secondary battery according to claim 21, wherein said average diameter of said fibers of said core layer is in the range of 0.5 to 5 μm, while said average diameter of said fibers of said surface layers is in the range of 7 to 20 μm.

23. A nickel-hydrogen secondary battery according to claim 12, wherein a first surface of said separator is hydrophilic and a second surface located opposite to said first surface has a hydrophilic portion and a hydrophobic portion, and said separator is disposed between said positive electrode and said negative electrode such that said second surface thereof faces said negative electrode.

24. A nickel-hydrogen secondary battery according to claim 23, wherein said first surface has a hydrophobic portion, whose area ration is smaller than that of said second surface and is 10% or less, including 0%.

25. A nickel-hydrogen secondary battery according to claim 23, wherein an area ratio of said hydrophobic portion in the second surface of separator is in the range of 2 to 25%.

26. A nickel-hydrogen secondary battery according to claim 12, wherein said hydrogen-absorbing alloy is represented by a formula of $LmNi_xMn_yA_z$, wherein Lm represents lanthanum-rich misch metal, A represents at least one element selected from Al and Co, x, y and z are number which meets an equation of $4.8 < x+y+z < 5.4$.

27. A nickel-hydrogen secondary battery according to claim 12, wherein said electrolyte contains at least lithium hydroxide, and a concentration of lithium hydroxide in said electrolyte is in the range of 0.1 to 1.5N.

28. A nickel-hydrogen secondary to claim according to claim 12, wherein said electrolyte contains at least sodium hydroxide, and a concentration of sodium hydroxide in said electrolyte is in the range of 0.5 to 6.0N.

* * * * *